(12) United States Patent
Holt et al.

(10) Patent No.: US 12,331,630 B2
(45) Date of Patent: Jun. 17, 2025

(54) SYSTEM AND METHOD TO DETERMINE AND CONTROL WELLBORE STABILITY

(71) Applicant: DRILLDOCS COMPANY, Houston, TX (US)

(72) Inventors: Calvin Stuart Holt, Houston, TX (US); Francois Ruel, Victoriaville (CA); Martin E. Oehlbeck, Cohocton, NY (US)

(*) Notice: Subject to any disclaimer, the term of this patent is extended or adjusted under 35 U.S.C. 154(b) by 0 days.

(21) Appl. No.: 18/569,512

(22) PCT Filed: Jun. 17, 2022

(86) PCT No.: PCT/US2022/034092
§ 371 (c)(1),
(2) Date: Dec. 12, 2023

(87) PCT Pub. No.: WO2022/266504
PCT Pub. Date: Dec. 22, 2022

(65) Prior Publication Data
US 2024/0263553 A1    Aug. 8, 2024

Related U.S. Application Data

(60) Provisional application No. 63/212,146, filed on Jun. 18, 2021.

(51) Int. Cl.
*E21B 44/00* (2006.01)
*E21B 21/06* (2006.01)
(Continued)

(52) U.S. Cl.
CPC ............ *E21B 44/06* (2013.01); *E21B 21/065* (2013.01); *E21B 21/08* (2013.01); *E21B 44/00* (2013.01);
(Continued)

(58) Field of Classification Search
CPC ........ E21B 44/06; E21B 21/065; E21B 21/08; E21B 44/00; E21B 47/022; E21B 47/09;
(Continued)

(56) References Cited

U.S. PATENT DOCUMENTS 7,933,018 B2    4/2011    Vannuffelen et al.
8,818,779 B2    8/2014    Sadlier et al.
(Continued)

FOREIGN PATENT DOCUMENTS

CN    104136713 A    * 11/2014    ......... E21B 47/0002
WO    2021054840        3/2021

OTHER PUBLICATIONS

Du et al., Classifying Cutting, Volume at Shale Shakers in Real-Time via Video Streaming Using Deep-Learning Techniques, SPE Drilling & Completion (Year: 2020).*
(Continued)

*Primary Examiner* — Xiao Liu

(57) ABSTRACT

An image system captures images and automatically identifies objects in an object flow at one or more mechanical mud separation machines. A control signal may be generated to change one or more drilling parameters in response to identifying the objects in an object flow. These parameters may be one of a drill speed, an equivalent circulating density, or a control valve.

11 Claims, 17 Drawing Sheets

(51) Int. Cl.
  *E21B 21/08*    (2006.01)
  *E21B 44/06*    (2006.01)
  *E21B 47/022*   (2012.01)
  *E21B 47/09*    (2012.01)
  *E21B 49/00*    (2006.01)
  *G06V 10/25*    (2022.01)
  *G06V 10/764*   (2022.01)
  *G06V 10/82*    (2022.01)
  *G06V 20/50*    (2022.01)

(52) U.S. Cl.
  CPC ............ *E21B 47/022* (2013.01); *E21B 47/09* (2013.01); *E21B 49/005* (2013.01); *G06V 10/25* (2022.01); *G06V 10/764* (2022.01); *G06V 10/82* (2022.01); *G06V 20/50* (2022.01)

(58) Field of Classification Search
  CPC ....... E21B 49/005; E21B 21/01; G06V 10/25; G06V 10/764; G06V 10/82; G06V 20/50
  See application file for complete search history.

(56) References Cited

U.S. PATENT DOCUMENTS

| | | | |
|---|---|---|---|
| 9,046,509 B2 | 6/2015 | Dvorkin et al. | |
| 9,651,468 B2 | 5/2017 | Rowe et al. | |
| 9,670,775 B2 | 6/2017 | Tjhang et al. | |
| 9,912,918 B2 | 3/2018 | Samuel | |
| 9,951,607 B2 | 4/2018 | Wessling et al. | |
| 10,019,875 B1 | 7/2018 | Alghooneh et al. | |
| 10,151,677 B2 | 12/2018 | Kulkarni et al. | |
| 10,633,941 B2 | 4/2020 | Teodorescu | |
| 10,643,322 B2 | 5/2020 | Holton et al. | |
| 10,781,692 B2 | 9/2020 | Francois et al. | |
| 10,796,424 B2 | 10/2020 | Parmeshwar et al. | |
| 10,927,671 B1 | 2/2021 | Tonner et al. | |
| 10,954,729 B2 | 3/2021 | Torrione et al. | |
| 2006/0162962 A1 | 7/2006 | Koederitz et al. | |
| 2010/0044034 A1 | 2/2010 | Bailey | |
| 2011/0210083 A1 | 9/2011 | Scott et al. | |
| 2011/0220410 A1 | 9/2011 | Aldred | |
| 2014/0020954 A1 | 1/2014 | Pelletier et al. | |
| 2014/0214325 A1 | 7/2014 | Wessling et al. | |
| 2014/0333754 A1 | 11/2014 | Graves et al. | |
| 2015/0013448 A1 | 1/2015 | Smith | |
| 2015/0235544 A1 | 8/2015 | Hernandez et al. | |
| 2016/0090799 A1 | 3/2016 | Geehan et al. | |
| 2016/0130928 A1 | 5/2016 | Torrione | |
| 2016/0370274 A1 | 12/2016 | Rowe et al. | |
| 2017/0056928 A1 | 3/2017 | Torrione | |
| 2017/0056929 A1 | 3/2017 | Torrione | |
| 2017/0058620 A1 | 3/2017 | Torrione | |
| 2017/0058621 A1 | 3/2017 | Bailey | |
| 2017/0314369 A1 | 11/2017 | Rosano | |
| 2019/0302310 A1 | 10/2019 | Fox et al. | |
| 2019/0368287 A1 | 12/2019 | Shekhar et al. | |
| 2019/0368347 A1 | 12/2019 | Kulkarni et al. | |
| 2020/0126386 A1 | 4/2020 | Michakopulos et al. | |
| 2020/0157929 A1 | 5/2020 | Torrione | |
| 2020/0284145 A1 | 9/2020 | Elgamal | |
| 2020/0326322 A1 | 10/2020 | Farrukh Hamza | |
| 2020/0332654 A1 | 10/2020 | Rowe et al. | |
| 2020/0363289 A1 | 11/2020 | Shekhar et al. | |
| 2021/0019875 A1 | 1/2021 | Parmeshwar et al. | |
| 2021/0027144 A1 | 1/2021 | Madasu et al. | |
| 2021/0090239 A1 | 3/2021 | Pattnaik et al. | |
| 2021/0189813 A1 | 6/2021 | Torrione | |
| 2022/0018241 A1* | 1/2022 | Affleck | E21B 47/00 |
| 2024/0257379 A1* | 8/2024 | Torrione | E21B 21/065 |

OTHER PUBLICATIONS

International Search Report and Written Opinion for PCT/US2022/034092, mailed Nov. 4, 2022, 15 pgs.

Iastrebov, "Conceptual Design of Drilling Cuttings Analysis System Based on Machine Learning Techniques", Diss. University of Leoben, Jul. 2020, 44 pgs.

Xunsheng et al., "Classifying Cutting, Volume at Shale Shakers in Real-Time via Video Streaming Using Deep-Learning Techniques", SPE Drilling & Completion, 2020, 12 pgs.

Marana, et al., "An Intelligent System for Petroleum Well Drilling Cutting Analysis", International Conference on Adaptive and Intelligent Systems, 2009, 6 pgs.

Guilherme, et al., "Fast Petroleum Well Drilling Monitoring Through Optimum-Path Forest", Journal of Next Generation Information Technology, vol. 1, No. 1, May 2010, 9 pgs.

Marana, et al., "An Intelligent System to Detect Drilling Problems Through Drilled Cuttings Return Analysis", IADC/SPE Drilling Conference annd Exhibition, Feb. 2010, 8 pgs.

Han, et al., "Real-time 3d Computer Vision Shape Analysis of Cuttings and Cavings", SPE Annual Technical Conference and Exhibition 2018: SPE-191634-MS, Sep. 24, 2018, 16 pgs.

Covar Applied Technologies, "Video Processing for Improved Drilling", DEA, Mar. 20, 2013, 25 pgs.

Schuurmans, "Classification of Images in Real Time with Image Analytics", Halliburton Landmark Innovation Forum & Expo 2019, Aug. 28, 2019, 23 pgs.

Han, "Automated Computer Vision System for Real-Time Drilling Cuttings Monitoring", Thesis, The Graduate School of The University of Texas at Austin, Aug. 2016, 112 pgs.

Ripperger, et al., "Safer and Faster Drilling Through AI Driven Cuttings Monitoring—An Operators Approach", ADIPEC, Abu Dhabi, UAe, SPE-211759-MS, Oct. 31, 2022-Nov. 3, 2022, 18 pgs.

PCT International Search report and Written Opinion in International Application PCT/US2022/029230, mailed Sep. 27, 2022, 9 pgs.

Non-Final Office Action, U.S. Appl. No. 17/190,397, mailed Feb. 23, 2023, 16 pgs.

* cited by examiner

SYSTEM AND METHOD TO DETERMINE AND CONTROL WELLBORE STABILITY

CLAIM OF PRIORITY

This application is a U.S. National Stage application of PCT no. PCT/US22/34092, which claims priority to and the benefit of U.S. Provisional Application No. 63/212,146, filed Jun. 18, 2021, titled "System and Method to Determine and Control Wellbore Stability", the disclosures of which are hereby incorporated by reference herein in their entirety.

BACKGROUND

The oil and gas industry often uses wellbore drilling to access pockets of oil and gas in underground features. Current techniques to access the wellbore formation include drilling, using pipe and drill bits, into the ground. Often fluid is pumped down the center of the well through the pipe to carry the bit cuttings up out of the well via the wellbore annulus. The fluid also serves as a force to stabilize the wellbore to prevent hole collapse during the drilling operation. Additionally, the fluid flow carries objects (including bit cuttings or cuttings) out of the wellbore in an object flow. The objects in the object flow are typically separated from the fluid by a mechanical mud separation machine (MMSM). The fluid is often then recycled back to the well.

Drilling engineers must control various drilling operational parameters to effectively, efficiently, and safely form the wellbore. These drilling operational parameters include drill speed, fluid density, flow rate, well pressure, etc. Improper control often leads to well formation failure. For example, too much fluid pressure in a wellbore could fracture the rock surrounding the wellbore—too little pressure could lead to hole collapse.

Current methods of controlling operational wellbore parameters rely on, in part, predictive models. For example, prior ground surveys, historical well data, and estimated rock type may all be used to calculate a recommended drill speed, fluid density, well pressure, flow rate, etc. Issues arise, however, when the actual conditions at the drill site deviate from the predictive models. For example, an unanticipated change in rock type or formation pressure could render the recommended drilling operational parameters ineffective or worse. For example, using recommended drilling operational parameters irrespective of the actual conditions could lead to well collapse, premature rock fracturing, equipment failure, and the like. Such problems occur at all stages of drilling.

Wellbore instability has a significant adverse impact on production and reservoir potential. In addition to the capital and operating costs incurred when tools and time are lost attempting to recover or redrill sections, the cost of lost production when these attempts are not successful is high.

Current techniques to identify wellbore issues include visually inspecting objects in the object flow. For example, rig personnel often visually inspect objects in the object flow to identify cavings, cutting blockages, and premature fracturing of the rock formation by visually inspecting objects in the object flow. That is, these rig personnel may view rocks in the object flow and subjectively decide whether the rocks are indicative of a wellbore collapse, BHA failure, poor hole cleaning, premature fracking, etc.

Manual inspection remains problematic, however. It is expensive to staff rig personnel to stare at objects in an object flow. Additionally, human beings lack the ability to quantify the visual inspection on a continuous basis. Further, the analysis is subject to human error and subjective judgment. Thus, it remains desirous to develop systems and methods to automatically monitor object flow and adjust drilling operational parameters and predictive models based on the monitored object flow.

It is with these issues in mind, among others, that various aspects of the disclosure were conceived. Also, although relatively specific problems have been discussed, it should be understood that the embodiments presented should not be limited to solving the specific problems identified in the introduction.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

To address some of the challenges described above, as well as other challenges, apparatuses, systems, and methods for automatic image analysis of wellbore objects are described. Deviations in data associated with features of the objects, perhaps extracted to determine trends or update models, may be used to control wellbore and rig equipment. Wellbore objects can include cuttings, cavings, fluid, retained fluid, rubble, metal, plastic, rubber lost circulation material and others. In examples, monitoring, using computer vision systems, capture and track real-time deviations in object size distribution, object shape distribution, object color and object volume deviations. These deviations may be used to identify issues with wellbore penetration, fluid properties, wellbore hydraulics, equipment condition, direction, casings, wellbore volume, lag depth, hole conditioning, and drilling parameters. The systems described herein may be used to control various operational parameters and/or update predictive models to compensate for such deviations. For example, the system can automatically make adjustments to the operational parameters and/or update a predictive model accordingly.

More specifically, computer imaging may detect deviations in wellbore objects' size, size distribution, shape, color, type, absence, and/or presence, and volume during active drilling operations. This may lead to a better understanding of the current wellbore condition, drilling effectiveness, and hole cleaning efficiency. Such imaging may be performed by an image detection system using a Deep Neural Network. The relationship between deviations in these parameters and operational conditions may be expressed in a number of ways, including:

Determining the existence of under weighted fluid and over-pressured formations by detecting an increase in cavings, and deviations in the size, volume, and shape distribution of cuttings and cavings.

Determining the existence of washout and over gauge wellbore sections by detecting caving or tracer deviations in size, volume, and shape distribution.

Information about the absolute and/or relative change in cutting volumes or other characteristics of cuttings coming off the shaker table may, under certain conditions, be combined with circulation system parameters and/or other drilling parameters, such as rate of penetration, and be used to generate a control request or update a predictive model. For example, a sudden change, either decreases or increases, in the cuttings volume not correlated to changing rate of penetration may indicate hole cleaning problems, influxes, and/or other changes in conditions. Additionally, a sudden change in the spatial characteristics of the cuttings may indicate a cave-in or other phenomena. Changes in size distribution of the cuttings may also indicate changes in morphology. Increases over the average volume of cuttings during drilling may indicate an increased rate of penetration: if the volume increases, and the rate of penetration does not, then a washout may have occurred. Outliers of an abnormal size may indicate drilling problems (e.g., increased metal cutting volume could indicate a broken bit).

Trends in the data (e.g., consistent changes in shape, size, volume, according to threshold amounts of change of a selected time interval or intervals) can indicate progress or problems in an operation. Thus, the changes in data can be monitored as trends, and the trends can also be published for observation and action. Thus, the activity may comprise publishing trends in the data.

The changes in shape, size distribution, type, or volume of the down hole cuttings can be correlated to a number of operational conditions. Thus, the conditions associated with the borehole drilling or borehole pumping operations may comprise one or more of rate of penetration, formation pore pressure, weight on bit, drill pipe torque, or drilling angle.

The changes in shape, size distribution, or volume of the down hole cuttings can also be correlated to operational efficiency, such as drill bit cutting efficiency, or sweeping efficiency. Thus, a running indication of efficiency can be published, if desired. Therefore, the activity may comprise indicating an efficiency of a borehole drilling operation or a borehole pumping operation as a sweeping operation, based on the data.

Determining the existence of transition regions to salt, tar, or karst formations by detecting rubble rocks and deviations in the rubble and controlling the operational parameters based on the same.

Determining the absence or presence of fluid and its retention on a wellbore object by detecting its light reflection and color.

Determining the rig fluid processing efficiency by detecting the ratio of liquids versus wellbore objects. This information may also be used to optimize, improve, or adjust the shale-shaker angle (saving mud, and/or increasing efficiency); alert an operator to expected and/or unexpected changes in the cuttings volumes which may, in some cases, be indicative of hole cleaning, influx, losses, and/or other problems; and show whether or not the volume and characteristics of cuttings exiting the shaker is less than, greater than or approximately commensurate with the rate of penetration ("ROP").

Determining the efficiency of lost circulation material (LCM) in weak, fractured or under-pressured formations by detecting the presence or absence of the materials size, shape, and volume returned at the MMSM.

Measuring the confidence and probability of hole cleanliness and/or stability by combining data generated by the system for determining and controlling wellbore stability with a real-time expert knowledge-based system, including probabilistic and physics models and Bayesian methods.

Determining drilling and pumping ng equipment conditions by detecting nonformation of wellbore objects, including metal, plastic, and rubber objects.

Determining drilling bit efficiency through analysis of cutting size, shape, and volume.

Identifying equipment failures, both anticipated and unplanned, may be detected as BHA and rig pump metal, plastic, and rubber components.

Determining sweep efficiency by monitoring wellbore objects volume during a sweep operation (e.g., the volume of wellbore objects cuttings increases with increasing sweep efficiency and then decreases as wellbore objects cuttings are moved out of the hole).

Determining the efficiency of bottom hole assembly (BHA) tools hole cleaning capabilities.

Determining deviations in a geological formation composition by monitoring cutting size, size distribution, color, and shape.

Detecting deviations in baseline size, volume, and shape of cavings may indicate the fluid rheology needs adjusting.

Detecting deviations in the size and sphericity (due to grinding) of objects may indicate inadequate object transport properties in the predictive models (e.g., cuttings transport model, geomechanics models) due to dynamic wellbore geometry deviations, wellbore instability or inadequate wellbore hydraulics.

Detecting the absence/presence of objects can detect deviations from normal operations (e.g., the lack of objects detected can indicate a MMSM not operating when it should be, the presence of fluid in the ROI can indicate a MMSM is not operating efficiently, and the absence of metal, plastic or rubber may indicate operations are normal).

Determining the fluid rheology information based on the height of the object flow bouncing in the shale shaker.

Increases in the volume of cuttings during drilling may indicate an increased rate of penetration: if the volume increases, and the rate of penetration does not, then a washout may have occurred.

It will be appreciated that for each of the above, an image or vision system may be used to capture images and, using a DNN, identify objects in one or more images over time (e.g., a video stream) to make such determinations. Additionally, for the examples above (and others) control signals, request for control, and/or updates to predictive models may be generated. This may allow for changes in the operational parameters of the wellbore. This may, in some implementations, aid in avoiding well failure, increase well productivity, and increase well safety.

In some embodiments, measurements of the size, shape, color, and volume of objects over time is captured. These captured measurements can be used to determine an average, which is used to establish a baseline. Changes from the baseline may trigger the systems to request an operational parameter change via a control signal.

Aspects of the technology include a computer-implemented method of optimizing wellbore parameters. In an example, the computer-implemented method comprises receiving image data from a mechanical mud separation machine (MMSM), the image data including image data of an object flow: identifying, using the image data, at least one wellbore-state indicator: determining, based on in part the identifying at least one wellbore-state indicator, to send information to control at least one wellbore parameter; and sending the information. The at least one wellbore indicator may include a plurality of cavings. The at least one wellbore parameter may include at least one selected from the group consisting of: mud weight, wellbore-fluid hydrostatic pressure, and wellbore-fluid flowrate. The method may further include receiving, by a control application of a wellbore, the information; and based on the received information, adjusting the hydrostatic pressure of a wellbore. Identifying at least one wellbore indicator may comprise analyzing the image data using a Deep Neural Network. Determining may also be based on in part at least one operational information of the wellbore. The operational information of the wellbore may be a standpipe pressure, a vertical depth of a drill head, a well inclination, or a predicted rock strength. The computer may further comprises determining to change at least one ROI based on the received image data: changing at least one ROI by selecting an ROI in a falling zone of the MMSM: receiving additional image data at the falling zone: identifying one or more additional objects by analyzing the additional image data using the DNN: determining that the one or more additional objects are beyond a predetermined threshold; and sending additional information to change at least one additional wellbore parameter based on determining that the one or more additional objects are beyond a predetermined threshold.

Aspects of the technology include a computer-implemented. The method may comprise receiving imaging information related to an object flow of a mechanical mud separation machine (MMSM): determining operational information from said imaging information from a mechanical mud separation machine (MMSM), the image data including image data of an object flow: determining actual drilling operational parameters: comparing the actual parameters to the predicted parameters: taking remediation action when data varies from a preset.

Determining operational information may comprises receiving a predicted rate of objects in an object flow of the (MMSM): determining an actual rate of objects in an object flow: comparing the actual rate to the predicted rate. Taking remediation action may comprise updating the predicted rate based on the model. Updating the predicted rate may comprise at least one of updating a rock type, a fluid density, a drilling speed, or a hole size. Comparing the actual rate to the predicted rate may comprises comparing a rate of a predicted shape of cuttings to a rate of an actual shape of cuttings. Updating the predictive model may comprises changing the carrying capacity of the fluid based on the actual shape of the cuttings. Updating the predicted rate based on the model may comprise: sending, over the Internet, a request to change the model. Determining the actual rate of objects in an object flow may comprise determining a number of cavings per time.

Aspects of the technology include a computer storage device storing instructions that, when executed, perform a method. In aspects, the method comprises receiving image data from a mechanical mud separation machine (MMSM), the image data including image data of an object flow: identifying, using the image data, at least one wellbore-state indicator: determining, based on in part the identifying at least one wellbore-state indicator, to send information to control at least one wellbore parameter; and sending the information. The at least one wellbore indicator may include a plurality of cavings. The at least one wellbore parameter may includes at least one selected from the group consisting of: mud weight, wellbore-fluid hydrostatic pressure, and wellbore-fluid flowrate. The computer-implemented method may comprise receiving, by a control application of a wellbore the information; and based on the received information, adjusting the hydrostatic pressure of a wellbore.

These and other aspects, features, and benefits of the present disclosure will become apparent from the following detailed written description of the preferred embodiments and aspects taken in conjunction with the following drawings, although variations and modifications thereto may be affected without departing from the spirit and scope of the novel concepts of the disclosure.

BRIEF DESCRIPTION OF THE DRAWINGS

The accompanying drawings illustrate embodiments and/or aspects of the technology. These drawings, along with the written description, serve to explain the principles of the disclosure. Wherever possible, the same reference numbers are used throughout the drawings to refer to the same or like elements of an embodiment, and wherein.

DETAILED DESCRIPTION

Figure 1:
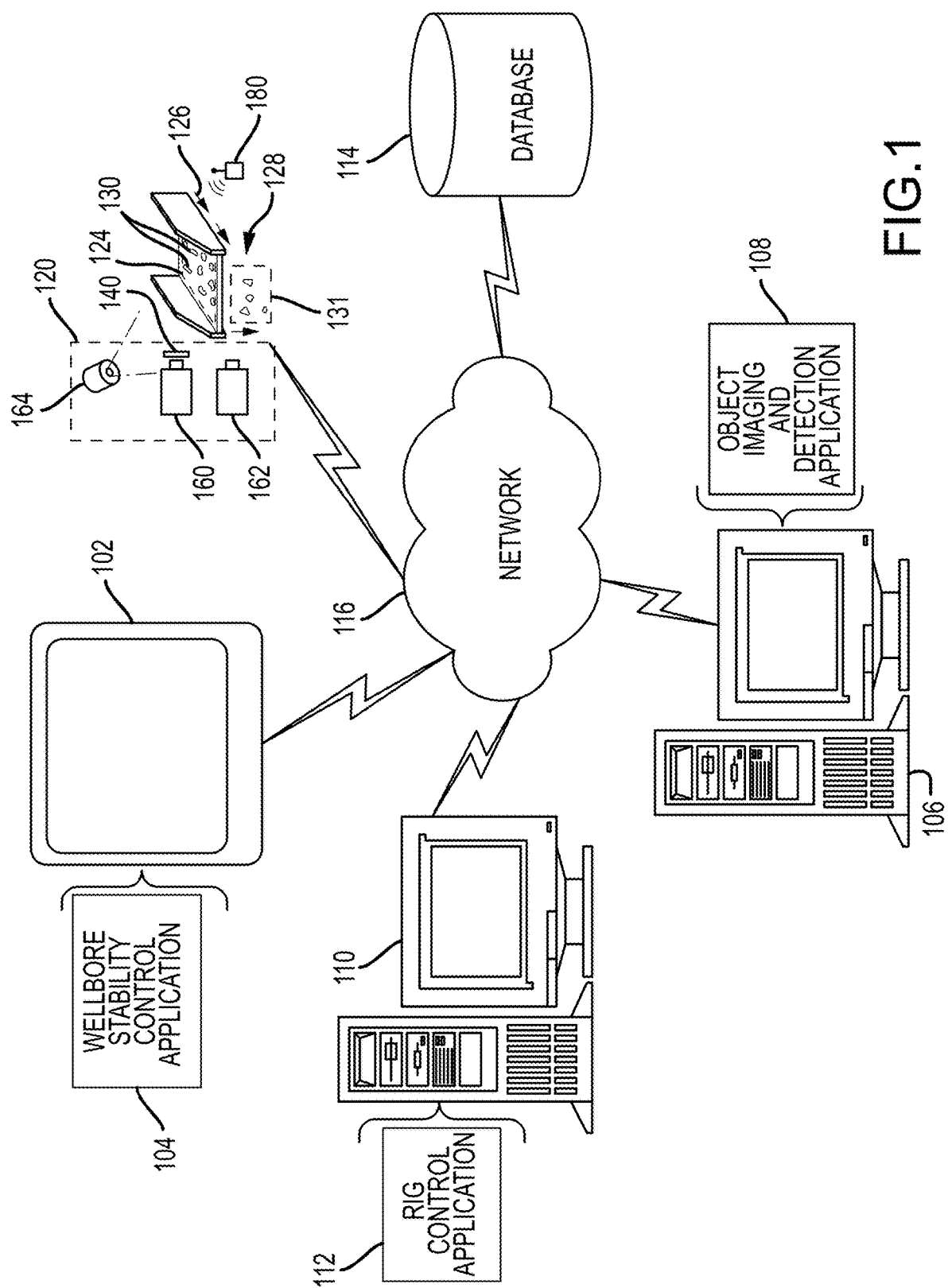
FIG. 1 is an example environment 100 in which the systems and methods described herein may operate.

FIG. 1 is an example environment 100 in which the systems and methods described herein may operate. As illustrated, FIG. 1 includes a first computing device 102 storing a wellbore stability control application 104, a second computing device 106 storing an object imaging and detection application 108, and a third computing device 110 storing a rig control application 112. It will be appreciated that though each application is shown on a single computing device, the applications may be run on a single computer or more than the computers shown as further described herein. Additionally illustrated is a storage device 114. Each of the first computing device 102, the second computing device 106, the third computing device 110, and the storage device 114 is in electronic communication via a network 116.

A wellbore stability control application 104 receives information from the object imaging and detection application 108, the rig control application 112, and/or the vision system 120 (referred hereinafter as System 100 data). Using some or all of the received information the wellbore stability and control application 104 determines one or more wellbore operational parameters to adjust, and/or the wellbore stability and control application determines various wellbore features to report, which wellbore features may be different than a predictive model's assumed wellbore features. The wellbore application 104 then sends information sufficient to adjust the operational parameters and/or update the predictive models. In aspects of the technology, wellbore application 104 sends a request to the rig control application 112 to make such adjustments. For example, based on the received information, the wellbore stability control application 104 may send signals to various pumps, valves, and/or hoppers to change pump speed, actuate a valve, or add material to a fluid.

Object imaging and detection application 108 receives information from a vision system 120. In examples, image vision system 120, captures images having two regions of interest ("ROI"), namely a first ROI 124 and a second ROI 131. ROIs are areas within a field of view of an imaging device that are selected for image analysis, such as analysis by object detection using a DNN as further described herein. There may be one or more, such as two, three, four, five, etc., ROIs within a field of view. In aspects of the technology, an ROI is a portion of a captured image (e.g., the portion may be of a certain size within a field of view). Further, the portion of the ROI may be consistent over a period of time. The image data captured within the ROI may be associated with a time stamp corresponding to the time at which the image data was captured.

In some examples, image vision system 120 has one or more imaging devices. It will be appreciated that a single imaging device may be used to capture a large field of view from which one or more ROIs may be selected. As illustrated, the image vision system 120 has a first imaging device 160 and a second imaging device 162. Imaging devices, such as first imaging device 160 and second imaging device 162, may be any device suitable to capture images of objects in an object flow, including objects flowing through an MMSM. Such imaging devices include charge couple device (CCD) cameras, Complementary Metal Oxide Semiconductor cameras, high-resolution cameras, visible light cameras, low light or infrared cameras, and/or LiDAR imaging devices. In some applications, the vision system 120 may capture 3D profiles of objects in an object flow using one or more imaging devices that relate to LiDAR, stereo cameras, ultrasound sensors, or electromagnetic waves sensors, and/or other imaging devices now known or later developed capable of capturing 3D images.

Also illustrated is an additional light source 164. In aspects, one or more additional light sources 164 illuminates objects in an object flow (or other objects in a field of view), such as object flow 126. A light source may be an ultraviolet light, an incandescent light, a white light, tungsten light, infrared light, or light-emitting diodes (LEDs) to illuminate wellbore objects. The light source may be capable of generating various types of light, including near, mid, or far wave infrared lights, the visible spectrum, ultraviolet like, and the like.

The vision system 120 is illustrated in network communication with the various computing devices, such as a first computing device 102, a second computing device 106, and a third computing device 110. In aspects of the technology, the vision system 120 may transmit real-time information from imaging devices, including ROIs. In some aspects of the technology, the entire field of view is sent to a computing device 102 and/or a storage device 114. In other aspects, only the ROI is sent to the computing device 102 and/or the storage device 114. The image information may include wellbore object image information. The computing device 102 may be configured to process the image information. Such processing includes automatically identifying/classifying wellbore objects in the image as further described herein (e.g., using a DNN).

It will be appreciated that various ancillary devices may be employed with image vision system 120 without deviating from the scope of the innovative technology. For example, various lenses, filters, enclosures, wipers, hoods, lighting, power supply, a cleaning system, brackets, and mounting devices may comprise image system 120. Further, one or more of a mechanical camera stabilizer, a camera fog stabilizer, or the like may be employed. Image system 120 may be designed to operate in outdoor, harsh, all-weather, hazardous areas, and/or 24 hours per day. The enclosure and its components may be watertight, explosion-proof, and/or intrinsically safe.

Vision system 120 also includes modification device 140. In examples, a modification device may be employed to modify/reduce/focus the light (e.g., infrared/visible light/ultraviolet light, etc.) captured from the objects in the object flow. For example, modification device 140 may be one or more of polarizers, filters, and/or beam splitters to intercept light reflected or emitted by the wellbore objects, such as well bore objects 130, and to reduce the amount/type of light received by the imaging devices of the vision system 120.

For example, the modification devices 140 may be chosen based on the type of drilling fluid that is used. Polarizers may be used to align light energy in either the P or S directions (so that the processed energy is p-polarized, or s-polarized), or to give a blend of P and S polarized energy. Beam splitters can be used to reduce the spectrum of the received energy to some selected range of wavelengths. Filters can be used to further narrow the range to a select spectrum prior to image capture.

Additionally/alternatively, one or more modification devices 140, may be interposed between the objects 130 and/or the object flow 126 and the vision system 120 to reduce the number of wavelengths captured by the vision system 120. In examples, the reduction in wavelengths allows fluid and objects that may be in close proximity to other objects to become relatively transparent so that the other objects in the object flow are more prominently captured by the image devices of the vision system 120.

The energy modification devices may be adjustable to obtain a relatively strong image contrast for detection of the objects 130 within a fluid solution that has a dynamic composition. The selection of materials used in conjunction with the energy modification devices may depend on the hazards of the environment, including the chemical solutions present. These materials may include glass, polymers, and metals, among others.

In aspects of the technology, the images captured by vision system 120 include one or more ROIs. As illustrated, included is a first region of interest 124 and a second region of interest 131. The regions of interest may be selected to be a particular area of the MMSM, such as a falling zone of a shaker table or the entire MMSM. One or more ROIs may be selected and analyzed by an Object Imaging and Detection Application 108 to identify image aspects, including identifying objects in an object flow and identifying other objects in the ROI. Such identification may occur using a DNN. The region of interest may be automatically selected by the Object Imaging and Detection Application 108 as further provided herein. Further, though FIG. 1 illustrates identifying an ROI contemporaneous to the 30 imaging devices capturing the image, it will be appreciated that an ROI may be determined after the image is captured. Such determination may be applied to historical data stored in a database, such as storage device 114.

One or more environmental sensors 180 may be part of the vision system 120 to aid in image rendering. The sensors may be used to detect the environment of the image capture area. For example, a first imaging device 160 may capture a portion of an MMSM that is experiencing a vibration due to the operation of the MMSM. The vibration rate may be captured by the one or more environmental sensors 180 and be automatically associated with the images captured by the imaging device at the time of capture. The environmental sensors 180 may capture other environmental factors, such as MMSM operation speed, load, light, and others. The data captured by environmental sensors 180 may be used to change/alter the selected ROI.

Rig control application 112 may be in electronic communication with various equipment. (e.g., valves, pumps, etc.) associated with a wellbore rig. Rig control application 112, in aspects, receives and stores information from sensors/devices associated with equipment of a drill rig and wellbore. Drill rig devices capture and transmit information related to downhole BHA tool or rig equipment, including the depth and positional information of the drill bit. Gamma Ray readings, wellbore volume, and pump flow rate during a drilling operation, stand pipe pressure, fluid density, etc.

The rig control application 112 and third computing device 110 may include supervisory control and data acquisition (SCADA) systems. The SCADA system is a control system architecture comprising software, computers, networked data communications, and graphical user interfaces (GUI) for high-level process supervisory management, while also comprising other peripheral devices like programmable logic controllers (PLC), decentralized control system (DCS), model predictive controller (MPC) and discrete proportional-integral-derivative (PID) controllers to interface with the managed pressure drilling (MPD) and drilling rig's equipment. The SCADA hardware may execute software that will combine data from multiple sources and perform continuous optimization of the MPD controller setpoints and tuning parameters. The model predictive controller (MPC) may be running within the SCADA software architecture or on a separate controller and using the SCADA communication architecture to get and provide updated parameters. Circulating drilling fluid may transport rock fragments out of a wellbore. The rig control application 112 may use object information obtained from image data, data acquired by an MPD data acquisition (DAQ), and rig data acquisition (DAQ) to enable the SCADA system to determine the choke pressure, hookload, flow, torque, weight-on-bit (WOB), rate of penetration (ROP), rheology, and directional sensor information. These may be used to provide feedback and control to the drilling/pumping and MPD devices as well as generate monitoring information and alerts. The rig control application 112 receive, in aspects, control requests and model updates from the wellbore stability control application 104.

As illustrated, a storage device 114 is in electronic communication with the first computing device 102, the second computing device 106, the third computing device 110 via the network 116. The storage device 114 may be used to store acquired image and computational data, as well as other data in memory and/or a database. For example, the storage device 114 may store images captured by imaging devices along with associated data, such as the time of capture. Further, sensor data and other information may be associated with the image in a relational database or other databases. The object imaging and detection application 108 may retrieve such stored data for a variety of purposes. For example, as described further herein, the object imaging and detection application 108 may set new ROIs on an image that was captured in the past. The object imaging and detection application 108 may use image data stored on the storage device 114 to retrieve the historical image and/or a portion of the historical image data, including historical image data associated with the newly set ROI. Further, the storage device may store predictive modeling outputs from the rig control application 112.

The network 116 facilitates communication between various computing devices, such as the computing devices illustrated in FIG. 1. Network 116 may be the Internet, an intranet, or another wired or wireless communication network. For example, the communication network 116 may include a Mobile Communications (GSM) network, a code division multiple access (CDMA) network, $3^{rd}$ Generation Partnership Project (GPP) network, an Internet Protocol (IP) network, a wireless application protocol (WAP) network, a Wi-Fi network, a satellite communications network, or an IEEE 802.11 standards network, as well as various communications thereof. Other conventional and/or later developed wired and wireless networks may also be used.

Figure 2:
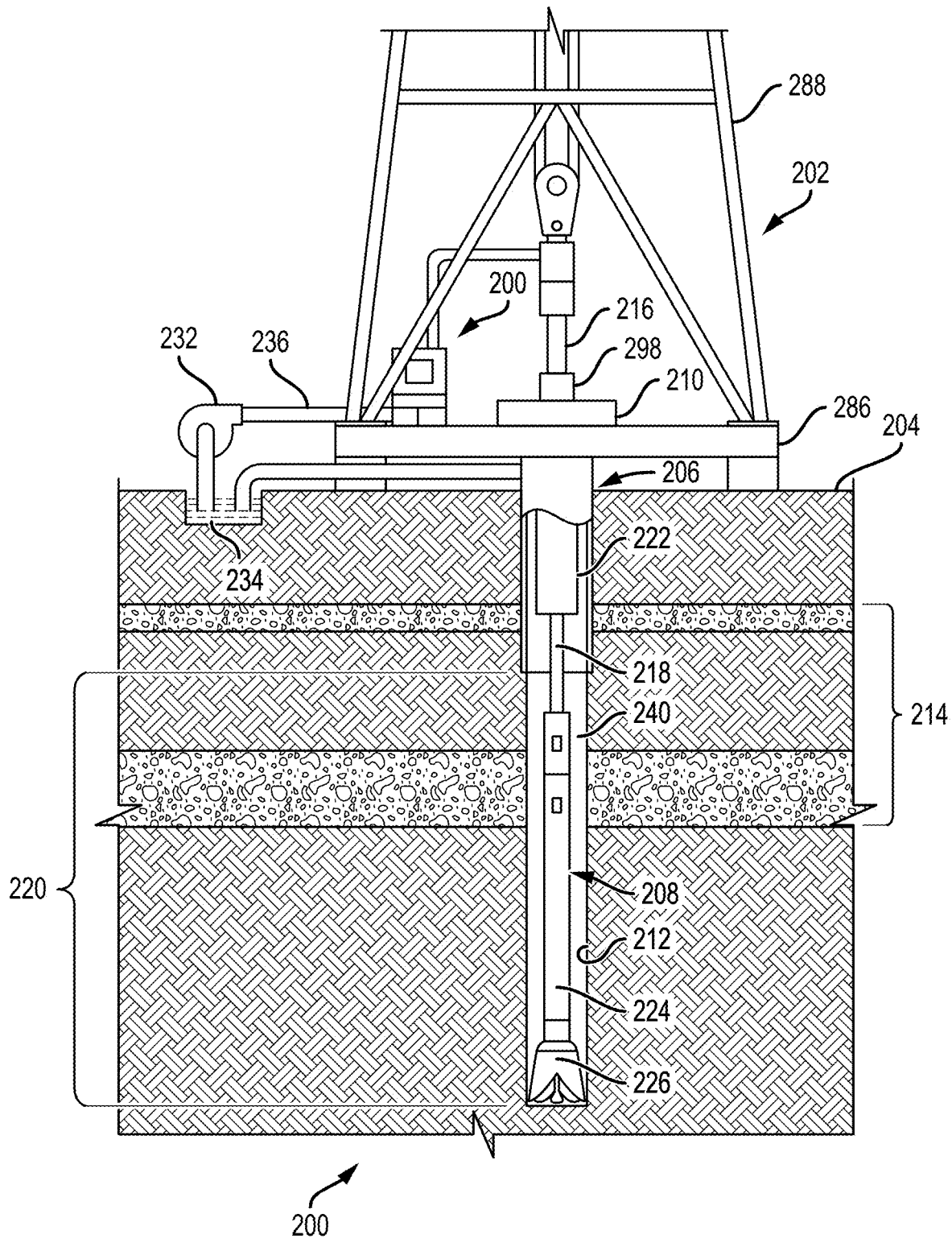
FIG. 2 provides an example of a drill rig.

FIG. 2 provides an example of a drill rig 200, which equipment and devices may be monitored and controlled by the various technologies described herein, including a rig control application described and a wellbore stability control application. Rig 202 may be located at the surface 204 of a well 206. Drilling of oil, gas, and geothermal wells is commonly carried out using a string of drill pipes or casings connected to a drilling string 208 that is lowered through a rotary table 210 into a wellbore or borehole 212. Here a drilling platform 286 is equipped with a derrick 288 that supports a hoist.

As illustrated, the drilling rig of 202 provides support for the drill string 208. The drill string 208 may operate to penetrate the rotary table 210 for drilling the borehole 212 through subsurface formations 214. The drill string 208 may include a Kelly 216, drill pipe 218, and a bottom hole assembly 220, perhaps located at the lower portion of the drill pipe 218.

The bottom hole assembly (BHA) 220 may include drill collars 222, a downhole tool 224, and a drill bit or float equipment 226 attached to casings for cementing. The drill bit or float equipment 226 may operate to create a borehole 212 by penetrating the surface 204 and subsurface formations 214. The downhole tool 224 may comprise any of a number of different types of tools, including MWD tools, LWD tools, casing tools and cementing tools, and others.

During drilling operations, the drill or casing string 208 (perhaps including the Kelly 216, the drill or casing pipe 218, and the bottom hole assembly 220) may be rotated by the rotary table 210. In addition to, or alternatively, the bottom hole assembly 220 may also be rotated by a motor (e.g., a mud motor) that is located down hole. The drill collars 222 may be used to add weight to the drill bit or float equipment 226.

The drill collars 222 may also operate to stiffen the bottom hole assembly 220, allowing the bottom hole assembly 220 to transfer the added weight to the drill bit and in turn, to assist the drill bit in penetrating the surface 204 and subsurface formations 214.

During drilling and pumping operations, a pump 232 may pump fluids (sometimes known by those of ordinary skill in the art as "drilling mud." "cement." "pills." "spacers." "sweeps." "slugs") from a processing pit 234 through a hose 236 into the drill pipe or casing 218 and down to the drill bit float equipment 226. In operation, the fluid may flow out from the drill bit or float equipment 226 and be returned to the surface 204 through an annular area 240 (e.g., an annulus) between the drill pipe or casing 218 and the sides of the wellbore borehole 212. The fluid may then be returned to the processing pit 234, where such fluid is processed (e.g., filtered). In some embodiments, the fluid can be used to cool the drill bit 226, as well as to provide lubrication for the drill bit 226 during drilling operations. Additionally, the fluid can be used to cement the wellbore and case off the sub-surface formation 214. Additionally, the fluid may be used to remove other fluid types (e.g., cement, spacers, and others), including wellbore objects such as subsurface formation 214 objects created by operating the drill bit 226 and equipment failures.

The fluid circulated down the wellbore 212 to the processing pit 234 a back down the wellbore 212 has a density. Various operational parameters of the drill rig 200 may be controlled. For example, the density of the fluid, the flow rate of the fluid, and the pressure of the wellbore 212 may be controlled. Control of the various operational parameters may be accomplished using a computing system 200, which may run/store (or be in electronic communication with) a wellbore stability control application and/or a rig control application as described herein. The drill rig, equipment, and bit, and other devices may be equipped with various sensors to monitor the operational performance of the rig, ad these sensors may be in electronic communication with the computing system 200. In aspects of the technology, computing system 200 is the same or similar to the third computing device 110 described above with reference to FIG. 1.

Figure 3:
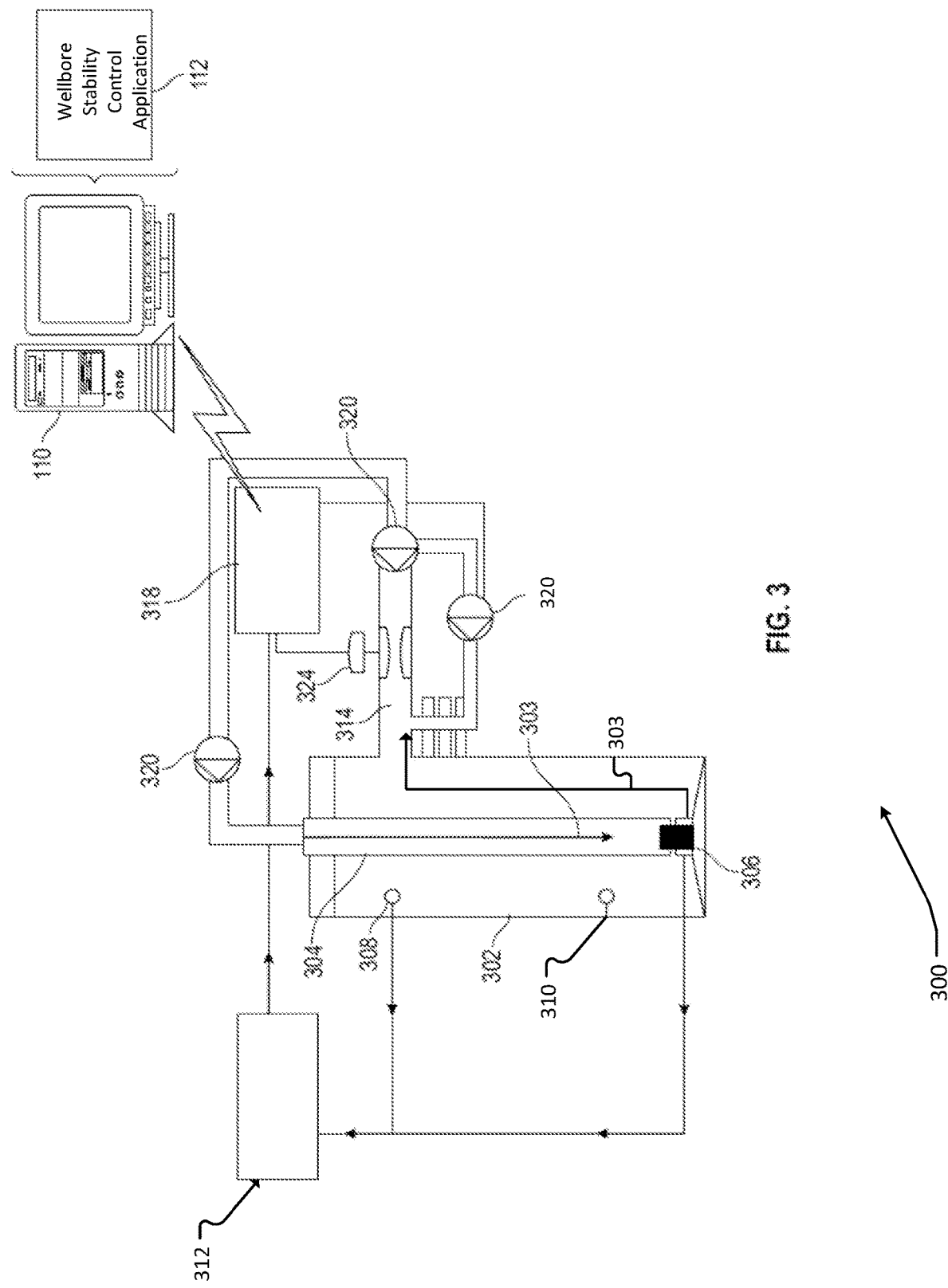
FIG. 3 is a diagram illustrating a managed pressure drilling (MPD) system 300 according to an example of the instant disclosure.

FIG. 3 is a diagram illustrating a managed pressure drilling (MPD) system 300 according to an example of the instant disclosure. FIG. 3 illustrates a wellbore 302, in which is disposed a drill pipe 304 coupled to a drill bit 306. The drill pipe 304 pumps fluid 303 down to the wellbore 302. The fluid 303 is returned via a fluid return 314. The fluid return may be a pipe, trough, etc. Various pumps 320 assist movement of the fluid 303 through the system 300, and each pump may be controlled to increase/decrease flowrate of the fluid 303 through the system 300. It will be appreciated that various MMSMs with vision systems (such as the vision systems 120 disclosed herein) may be placed along the fluid return to identify one or more objects in a flow.

In examples, the MPD controller 318 is in electronic communication with the control valve 324, a first pressure sensor 308 and a second pressure sensor 310. The valve 324 may send a signal indicating the position of the control valve 324, the first pressure sensor 308 may send a signal indicating the pressure at a top portion of the well, the second pressure signal 310 may send a signal indicating the pressure at the bottom portion of the well, and the pumps 320 may send a signal indicating the motor speed and/or flow rate through the pump. Fluid density may be tested or an in-situ sensor may be used, and these results may be sent to the MPD controller unit 318.

The MPD controller unit 318 may send various control signals to various equipment of the system 300 such as pumps 320 and the control valve 324. For example, the MPD controller unit 318 may send control signals to increase the pump speed, actuate the valve, or add more material to the fluid to increase the equivalent circulating density (ECD). In aspects, such control will change the pressure, flow rate, and fluid density of the fluid 303 in system 300. A monitoring system 312 may allow the display, via a computer display, for example, the various operational parameters and conditions of the wellbore. It will be appreciated that a drilling system may have more or less valves, pumps, flow sensors, and pressure sensors than those depicted in FIG. 3 without departing from the spirit of the innovative technologies.

Also illustrated is a third computing device 110 storing a Rig Control Application 112 in electronic communication with the MPD controller 318. The Rig Control Application 112 may have the same or similar properties as those described with reference to FIG. 1, and may be in electronic communication with the other various computing systems (not shown) as described with reference to FIG. 1. For example, the Rig Control Application 112 may receive information from a wellbore stability control application and translate/send that information to the MPD Controller 318 to control various operational parameters of the system 300, including fluid flow rate, pressure, and/or fluid density.

It will be appreciated that the system 300 may also include a pressure containment device, other pressure/flow control device, a flow control device for the inlet stream, on the injection line (rig pumps), a directional drilling device guiding the wellbore trajectory and weight on bit (hookload), etc., that may be controlled using the rig control application 112 and/or the MPD Controller 318.

Figure 4:
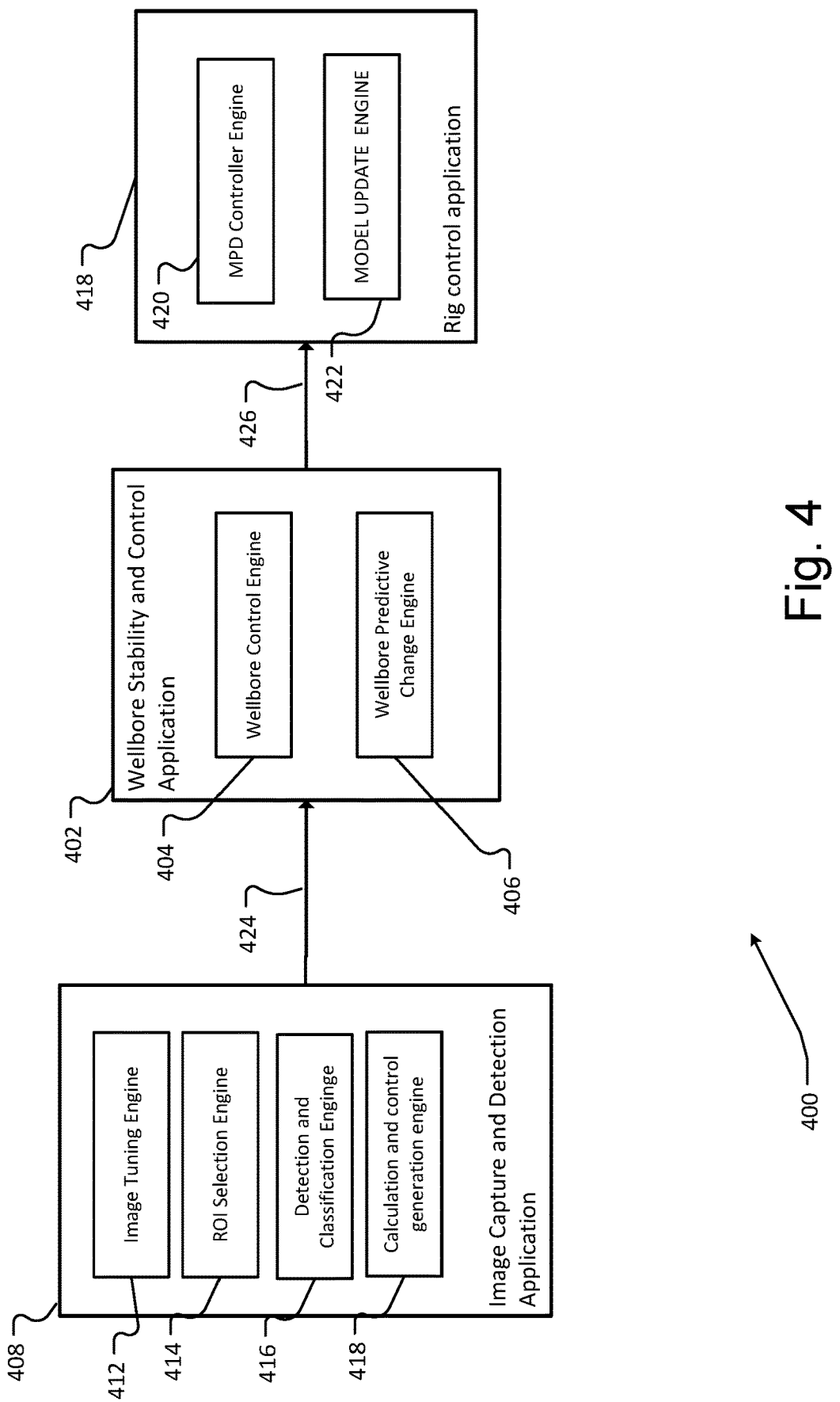
FIG. 4 illustrates example communication pathways between a wellbore stability and control application, an image capture and detection application, and a rig control application.

FIG. 4 illustrates example communications signals 424 and 426 between a wellbore stability and control application 402, an image capture and detection application 408, and a rig control application 418. It will be appreciated that each of these engines may be stored and executed on computing devices, such as the computing devices described herein.

As illustrated, the image capture and detection application 408 includes an image tuning engine 412, an ROI selection engine 414, and a detection and classification and engine 416. In aspects of the technology, the image tuning engine 412 uses environmental factors from a drill operation when setting parameters of the one or more imaging devices. For example, the image tuning engine 412 may receive information regarding environmental factors from one or more sensors, such as environmental sensors 180, a light source 164, a drill rig sensor and/or other information. The information may be transmitted via a network. Additionally, the image tuning engine 412 may receive information that events/objects of interest are occurring at other devices, which may trigger the control system to turn on the device and/or begin capturing/storing image data. To provide specific, nonlimiting examples, the amplitude and frequency signals captured by one or more sensors relating to motors (indicating motor speed, for example), flow rate detectors, or other operational indicators indicating an operating environment that may affect image capture may be used to automatically adjust various settings of one or more imaging devices. Additionally, signals may be transformed into image data and analyzed by the DNN, which analysis may be output to the image tuning engine 412 to change the parameters of an imaging device.

As illustrated, image capture and detection application 408 includes an ROI selection engine 414. ROI selection engine 414 handles determining the size, shape, and location of one or more ROIs. The selected one or more ROIs are then sent to the detection and classification engine 416 for further processing as described herein. The ROI selection engine 414 may use real-time captured image data to select an ROI. Additionally/alternatively, archived/historical image data may be used to select additional ROIs.

The size, shape, and number of ROIs is determined by a variety of factors. For example, the image device settings may influence the size of the ROI. In some examples, an imaging device may be set to a low shutter speed and/or low resolution such that a greater ROI is necessary. Environmental factors, speed of or presence of object(s) in an object flow, and other data may be used to determine the size of an ROI.

Additionally, the number of ROIs within a field of view and/or the number of ROIs across multiple fields of view may be determined using information received from the detection and classification engine 414. Also, a change/additional ROI may be determined by the ROI selection engine 414 based on a number of factors, including clarity of currently selected ROI, increased/decreased objects of potential interest in a current ROI, type of object detected in current ROI, speed/acceleration of object detected in the current ROI, and the like.

For example, where objects and or events of interest are detected, the ROI selection engine may determine to select additional ROIs for analysis. The ROI selection engine may receive information indicating that a current region of interest is in a wetter zone (e.g., screen of a shaker table) and an object captured in the wetter zone is of interest. The ROI selection engine may select additional ROIs from a different field of view (e.g., a different imaging device) or the same field of view and identify the object in a different section of the object flow. That section, for example, may be a relatively drier section, which, in examples, allows for easier classification by a detection and classification engine. If the sensor determines that an ROI is of abnormal or anomalous conditions (e.g., objects in object flow are too wet and/or clumpy to analyze), a new ROI may be selected, where the new ROI is selected to track an object beyond the initial ROI. For example, it may choose other ROIs at a time and place along the object flow corresponding to the likely position of the object of interest. The likely position may be determined by the estimated travel of the object moving in the object flow (e.g., based on velocity, acceleration, fluid-flow dynamics, etc.). A position may be selected based on a preferred downstream location (e.g., another MMSM) and the likely time/position of the object of interest.

ROI selection engine 414 may select an ROI to identify issues with one or more operational parameters (e.g., low flow, low/high pressure, etc.). For example, where low pressure is detected at a downhole location, additional ROIs may be selected at various MMSM to identify potential caving identification.

A detection and classification engine 416 receives image data for analysis of the image data. In aspects, the detection and classification engine preprocesses image data 416 in preparation for classification by a DNN. Image data may be an entire field of view of a camera and/or just one or more regions of interest of the field of view. In additional/alternative aspects of the technology, various environmental signals (e.g., vibration, motor electrical current, and acoustic signals) may be passed through a wavelet filter and imaged for classification. In aspects of the technology, the detection and classification engine uses a DNN to analyze the ROI to determine one or more image aspects in an ROI. The image aspects may include objects of an object flow, other objects, and/or signals that have been passed through a wavelet filter to generate an image classification by a DNN.

In aspects of the technology, DNN's are based on a series of visible and hidden layers conducting functions like convolutions to extract the features of an image. In examples, features are properties and visual characteristics of an image as identified by the neural network. In examples, the structure of the DNN includes many hidden layers built of multiple nodes that are connected to all nodes from the previous and the next layer. When training a model, the neural network is tuned by adjusting the gains (weights) used to connect all the nodes from one layer to another until the loss is at a minimal level. The loss is determined by comparing the result of the neural network with a reference like the labels of the images. In aspects, labels represent the whole image (classification) or the location and the nature of a specific region (object detection).

DNN models are available for re-training (mobilenetv2, YOLO, etc. . . . ), which means the DNN is structured in a way that it knows how to efficiently extract and organize the features found in an image. These models allow, in examples, customization of the last layers where the training process tunes the connecting weights between the features extracted and how they relate to trained conditions and objects. The training algorithm may use metadata attached to the training images that have been captured or validated by a human.

In aspects of the technology, the DNN is trained using a dataset with tagged objects (e.g., cavings, cuttings (of a particular size, shape, type, etc). For images comprising signals transformed using a wavelet filter, the tag may include operational parameters such as evidence of failure, evidence of vibration, etc. In aspects of the technology, the training process includes a data augmentation mechanism based on spatial augmentation, color space augmentation, and image blur. Further, the deep neural network may be trained for object detection and tracking based on a custom dataset of objects potentially found on a screen shaker. In examples, the DNN may be one or more of SSD, DSSD, DetectNet_V2, FasterRCNN, YOLO V3, YOLO V4, RetinaNet. The following training model can be used based on the installation: ResNet 10/18/34/50/101, VGG16/19, GoogLeNet, MobileNetV I/V2, SqueezeNet, DarkNet, SCP-DarkNet, EfficientNet.

The output from detection and classification engine 416 may be a list of identified objects, type of objects, number of objects, events (e.g., screen change out, wash cycle, excessive vibration), relative location (e.g., within various channels of a shaker table location), and/or size of the ROI. In aspects, a sub-image of each object detected is processed a second time to determine the exact contour using digital filters and correct the measured area data. A blob detection method may be used to detect regions in the zone of interest and compare those with the total area from the deep neural network. This may be used to confirm inspection performance and % hit. Static known objects or events in the field of view may be trained and part of the resulting inventory to monitor operational parameters of a rig.

Classification of objects in an object flow relates to wellbore objects in examples. It will be appreciated that a DNN may be trained to classify objects in an image in various ways. Examples include classifying objects as a cutting, a caving, a fluid, a tracer, rubble, debris, metal, plastic, rubber, etc.

In aspects of the technology, the detection and classification engine 416 may also perform unknown object detection. A DNN may return an object with low probability. Additionally, unknown objects may be detected using a combination of edge detection filters, blob detection method, and shape detection using a deep neural network to detect an object's shape. It may also include comparisons with a total area and the list of detected objects of an object shape inventory. Unknown object images may be saved for further training. Performance indicators may be generated to warn about unknown objects being detected.

Data may be collected from various sensors, devices, and computing devices, of a rig, shaker table, etc. such as System 100 data, to augment the information coming from the detection and classification engine 416. As a non-limiting example, the number of a particular object, as classified by the detection and classification engine 416, may be aggregated and associated with a time stamp. In some instances, the object information may also be associated with environmental factors, such as the positional information of a rig. Information regarding the aggregate objects is sent from the image capture and detection application to the wellbore stability and control application 402.

In aspects of the technology, the wellbore stability and control application 402 receives information via a communication signal 424 regarding objects detected in the object flow from the image capture and detection application 408. In some aspects of the technology, the wellbore stability and control application 402 determines whether deviations from a setpoint indicate potential wellbore problems. This may be accomplished using the collected data and/or predetermined set points. For example, the rate of detection of an object, change in the frequency of detection, the acceleration of change, or other metrics may be analyzed using the aggregated information of objects in an object flow collected/analyzed by image capture and detection application 408. This aggregation may be compared to a preset value by the wellbore control engine 404. The preset value may vary and/or change based on a variety of factors, including System 100 data. When the wellbore control engine 404 determines a deviation from one or more preset values exists, then information sufficient to control and/or communicate the deviation to the rig control application 418 may be generated and sent to the rig control application 418 via the communication channel 426.

In aspects of the technology, a calculation and control engine 418 tracks one or more objects in an object flow. Such tracking includes, in examples, a total number of objects over a period time, an average rate of objects over a period of time, a rate of change of objects over a period of time, and the like. The information may be sent via the communication signal 424 to a wellbore control engine 404 and/or a wellbore predictive change engine 406. In aspects of the technology, the wellbore control engine 404 determines, based on the tracking, a deviation from one or more values. In aspects of the technology, the one or more values are predetermined, such as by a predictive model.

As a specific, non-limiting example, a predictive model (such as a cuttings-transport model) may set/control a drill speed, an equivalent circulating density, a pump speed, etc. This may be based on assumptions determined prior to the wellbore during drilling. These assumptions may be verified/invalidated by the wellbore control engine 402 by monitoring objects in an object flow. For example, where the predictive model indicates that a certain size, shape, volume, number of cuttings, etc. should be present during drilling, the wellbore control engine 404 may compare such indication against the monitored value (using image data, for example). Where a deviation is present (e.g., where such deviation is greater than a preset value), the wellbore control engine 404 may request to control one or more drilling equipment and/or request a change to one or more drilling parameters. Additionally/alternatively, a wellbore predictive change engine 406 may request that one or more assumptions of a predictive model is updated.

In aspects of the technology, the image data may indicate that the drill may be run at a more efficient rate. For example, the image data may indicate little or no cavings, which may indicate that the drill may be run at a faster rate so as to dig the wellbore faster without sacrificing safety or wellbore integrity. In this way a "deviation" need not indicate a well failure.

Table 1 below provides example deviation identifications and example outputs that may be generated by the wellbore control engine 404. It will be appreciated that the object detected may be detected by training a DNN to recognize objects in an image at one or more MMSMs. Column 1 indicates image information detected (e.g., one or more objects detected using the systems and methods described herein) along with, optionally, one or more wellbore state identifiers, such as increased pressure. These wellbore state identifiers may be determined using one or more rig sensors as further described herein. The second column indicates an example output that may be sent (for example, electronically) to a control system of a drill rig, such as an MPD controller unit 318, and/or directly to drill equipment, such as a pump 320 and/or control valve 324.

TABLE I

| Image Information and/or Identified Wellbore State | Example Potential Outputs |
|---|---|
| Image Information includes: Low volume of cuttings (e.g., below a threshold) detected over a period of time + potentially one or more of the following detected Wellbore States: pipe overpull increasing torque jumping (e.g., jumping beyond predetermined threshold) standpipe pressure increasing equivalent circulating density increasing fluid viscosity reducing directionally sliding Hole filling up during connections when BHA resumes drilling | Send control signal to WOB to reduce ROP or cease drilling Send control signal to directional controller to stop slide and resume rotational drilling Send control signal to increase drilling rotary speed Send control signal to increase flow rate (e.g., increase pump speed, open valves) Send signal to fluid density unit to increase density |

TABLE I-continued

| Image Information and/or Identified Wellbore State | Example Potential Outputs |
| --- | --- |
| Image Information includes: Cavings detected + potentially one or more of the following detected Wellbore States:<br>pipe overpull increasing<br>pipe rotation torque erratic, jumping<br>standpipe pressure increasing<br>equivalent circulating density decreasing<br>hole fill on bottom<br>Hole filling up during connections when BHA resumes drilling<br>Blocky Caving detected potentially indicating potential formation pre-existing fractures | Send signal to close valve to adjust the back-pressure to change the Equivalent Circulating Density ("ECD")<br>Change direction of well e.g., by sending control signal to directional controller to turn BHA azimuthal heading<br>Change fluid rheology e.g., by sending signal to increase fluid density and/or ECD<br>Send control signal to WOB to reduce ROP or cease drilling<br>Send request to rig control application to change the direction of BHA<br>Send request to rig control application to reduce valve opening<br>Send request to rig control application to increase fluid density and/or ECD |
| Tabular Caving detected indicating potential formation slip failure | Send request to rig control application to increase fluid density and/or ECD<br>Send request to rig control application to decrease fluid loss<br>Send request to rig control application to reduce valve opening |
| Splintery Caving Detected indicating potential formation tensile failure | Send request to rig control application to increase fluid density and/or ECD<br>Send request to rig control application to reduce weight on bit to slow or Cease drilling |
| Rubble Caving Detected indicating a potential formation transition zone | Send request to rig control application to reduce weight on bit to slow or cease drilling<br>Send request to rig control application to reduce valve opening<br>Send request to rig control application to increase fluid density |
| Low cuttings | Change drilling parameter(s) to increase hole cleaning performance by:<br>Send request to rig control application to reduce weight on bit to slow or cease drilling<br>Send request to rig control application to increase pump speed<br>Adjust the back-pressure to change the Equivalent Circulating Density ("ECD") |
| Consistent cuttings volume indicates potential to drill faster | Increase ROP by;<br>Send request to rig control application to increase WOB<br>Send request to rig control application to decrease fluid density |
| No Cavings (e.g., indicating potential to drill faster) | Reduce downhole pressure by:<br>Send a request to rig control application to decrease fluid density<br>Send request to rig control application to increase valve opening |

Additionally illustrated as part of the wellbore stability and control application 402 is wellbore predictive change engine 406. In aspects of the technology, wellbore predictive change engine 406 uses the object information received from the image capture and detection application 408 to determine one or more assumptions of a predictive model that may be different from the observed well. In aspects of the technology, this information may be used to update the predictive models. Table two below provides example image information and/or identified wellbore state and the potential updates to a predictive model that may be made. Wellbore predictive change engine 406 then provides that information to a rig control application 418.

TABLE II

| Image Information and /or Identified Wellbore State | Potential Model Changes |
| --- | --- |
| Image Information includes: Low volume of cuttings (e.g., below a threshold) detected over a period of time + potentially one or more of the following detected<br>Wellbore States:<br>pipe overpull increasing<br>pipe rotation erratic<br>standpipe pressure increasing<br>quivalent circulating density increasing<br>fluid viscosity reducing<br>BHA directionally sliding to turn (e.g., Hole filling up during connections when BHA resumes drilling) | Inform and update cuttings transport or drilling hydraulics model by changing one or more variables such as:<br>Assumed/average cutting size and shape,<br>cuttings bed height (volume)<br>hole diameter as hole may have enlarged<br>change rotary speed<br>fluid viscosity |

TABLE II-continued

| Image Information and /or Identified Wellbore State | Potential Model Changes |
| --- | --- |
| Image Information includes: Cavings detected + potentially one or more of the following detected Wellbore States:<br>pipe overpull increasing<br>pipe rotation torque erratic, jumping (e.g., beyond predetermined threshold)<br>standpipe pressure increasing<br>equivalent circulating density decreasing as hole enlarges<br>hole fill on bottom | Inform and update wellbore stability or geomechanics model of;<br>Formation failure type<br>Direction of failure type<br>Collapse pressure<br>Inform and update cuttings transport or drilling hydraulics model of;<br>Change hole diameter<br>Change cutting size to reflect larger caving size and shape |

Rig control application 418 receives control requests and feature identification from the wellbore stability and control application 402 via a communications channel 426. In aspects of the technology, the MPD Controller Engine 420 will handle the control requests, verify whether action should be taken, and/or send a control signal to a pump, a valve, and/or a fluid-material hopper to change pump speed, actuate a valve, change hopper speed.

Additionally, the features identified may be sent to the model update engine 422. The model update engine 422 receives features and compares the identified features with the assumptive features in a predictive model. Where the feature is significantly differs (e.g., greater than a setpoint) the model update engine 422 may update a predictive model. Such updates may trigger changes to the control parameters where the control parameters are based on the assumptions in the model.

Figure 5:
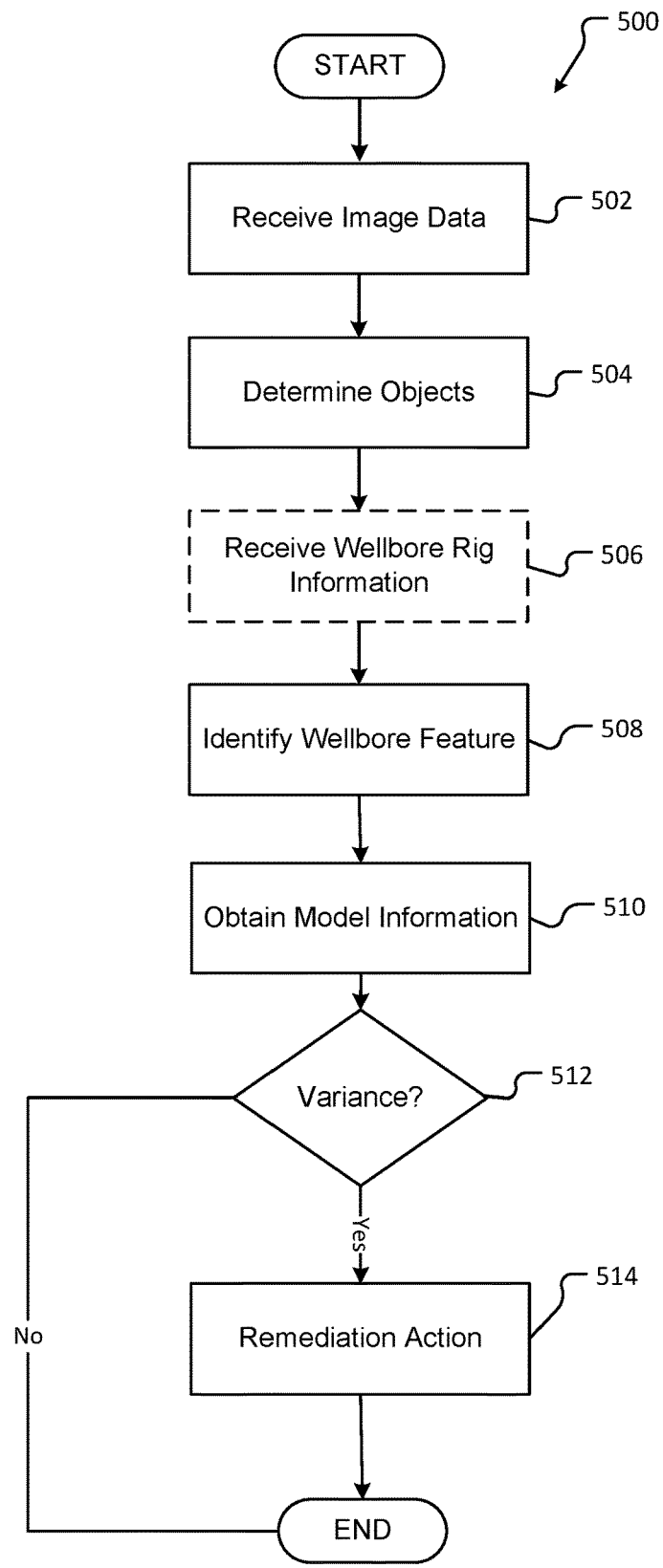
FIG. 5 is a method for updating a predictive model based on received image data.

FIG. 5 is a method 500 for updating a predictive model based on received image data. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

Method 500 begins with receive image data operation 502. In operation 502 image data is received from one or more MMSMs. The image data may be received from a vision system, such as the vision system 120 described with reference to FIG. 1. The image data may comprise one or more ROIs, and the image data may be of images captured from a shaker table. The image data may include one or more objects in an object flow, including such objects as cuttings, cavings, and debris.

Method 500 then proceeds to determine objects in an object flow operation 504. In operation 504, various objects are analyzed (using a DNN, for example). Such analysis may be performed using the object imaging and detection application and the various associated engines as further described herein. The analysis of the image data may determine the rate at which cuttings, cavings, and other debris are flowing through one or more MMSMs. The analysis may also classify and aggregate the number of cuttings, cavings, and other debris, by material, size, shape, color, or other characteristics that may be identified using a DNN.

Method 500 then optionally proceeds to receive wellbore rig information Operation 506. In operation 506, information regarding the wellbore is received. For example, a wellbore pressure, temperature, fluid flow rate, or fluid density may be received. This information may be received from one or more sensors at a drill rig.

Method 500 then proceeds to identify wellbore feature operation 508. In identify wellbore feature operation 508, the one or more features of the wellbore are determined. This determination may be made, in aspects of the technology, based on the rate at which cuttings, cavings, and other debris are flowing through the object flow as determined by operation 504. The determination may also be made by identifying the aggregate number/volume/type of cuttings, cavings, and other debris as determined in operation 504. The determination may also be made, in aspects of the technology, by the size and shape of the cutting, cavings, and other debris flowing through the one or more MMSMs. Additionally/ alternatively, the wellbore rig information operation may be used to identify wellbore feature operation 506.

Method 500 then proceeds to obtain model information operation 510. In operation 510, model information regarding a predictive model is obtained. In aspects of the technology, the information may be obtained by sending a request to another computing device, server, or cloud-based service. In other aspects, the information is obtained by accessing computer memory. The predictive model information may include one or more of cuttings transport model, drilling hydraulics, mechanical earth, wellbore stability and geomechanics information.

Method 500 then proceeds to determination 512. In determination 512, the wellbore feature identified in operation 508 is compared to the model information obtained in operation 510. If the model information varies from the ascertained feature identified in operation 508, a remediation action 514 may be taken. Such remediation action may include updating the model with the wellbore feature, acquiring more image data (e.g., by selecting additional ROIs for additional analysis), sending an alert, etc. If no variance (or no variance beyond a threshold) is detected, then the method ends.

As a particular example, carrying capacity may be determined using the captured image data. In particular, carrying capacity of a fluid is determined in part by the cuttings shape/size. Many models assume a spherical shape of the objects to be carried. When non-spherical shapes are detected, the cuttings transport model may be updated to account for the non-spherical shape. In examples, non-spherical shapes increase drag of the objects flowing in the object flow (e.g., caving types or cuttings grinding). This may result, for example, if the carrying capacity being reduced. Other changes may be identified, such as the changes described in Table II.

Figure 6:
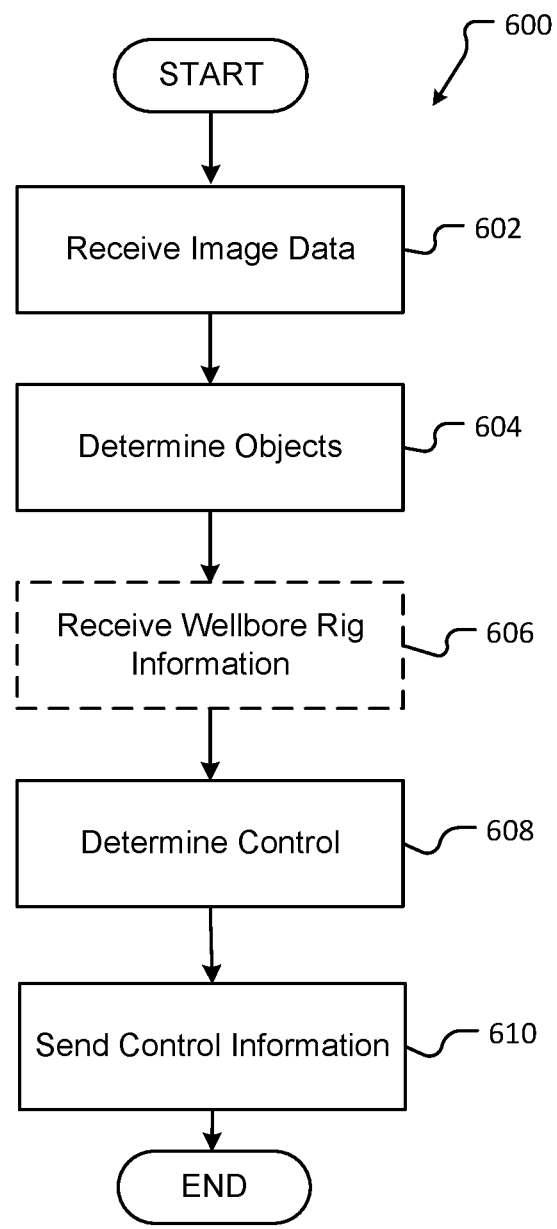
FIG. 6 is a method for controlling various operational parameters based on received image data.

FIG. 6 is a method 600 for controlling one or more rig parameters based on received image data. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

Method 600 begins with receive image data operation 602. In operation 602 image data is received from one or more MMSMs. The image data may be received from a vision system, such as the vision system 120 described with reference to FIG. 1. The image data may comprise one or more ROIs, and the image data may be of images captured from a shaker table. The image data may include one or more objects in an object flow, including such objects as cuttings, cavings, and debris.

Method 600 then proceeds to determine objects in an object flow operation 604. In operation 604, various objects are analyzed (using a DNN, for example). Such analysis may be performed using the object imaging and detection application and the various associated engines as further described herein. The analysis of the image data may determine the rate at which cuttings, cavings, and other debris are flowing through one or more MMSMs. The analysis may also classify the cuttings, cavings, and other debris, by material, size, shape, color, or other characteristics that may be identified using a DNN.

Method 600 then optionally proceeds to receive wellbore rig information Operation 606. In operation 606, information regarding the wellbore is received. For example a wellbore pressure, temperature, fluid flow rate, or fluid density may be received. This information may be received from one or more sensors at a drill rig.

Method 600 then proceeds to determine action operation 608. In determine wellbore action operation 608, the method determines one or more action to take based on the conditions of the wellbore. This determination may be made, in aspects of the technology, based on the rate at which cuttings, cavings, and other debris are flowing through the object flow. The determination may also be made by identifying the aggregate number/volume/type of cuttings, cavings, and other debris. The determination may also be made, in aspects of the technology, by the size and shape of the cutting, cavings, and other debris flowing through the one or more MMSMs. Additionally/alternatively, the wellbore rig information operation may be used to make the determination. Table one provides examples of actions that may be determined based on the conditions identified in operation 604 and/or 606.

Method 600 then proceeds to send control information operation 610. In operation 610, control information is sent to a controller and/or an application, such as the rig control application 112. The information may be information that a caving is detected along with a recommended action. In alternative/additional examples, the information may be a signal that directly instructs the rig control application to send control signals to actuate valves, add material to fluid, increase/decrease fluid pump speed, etc.

Figure 7:
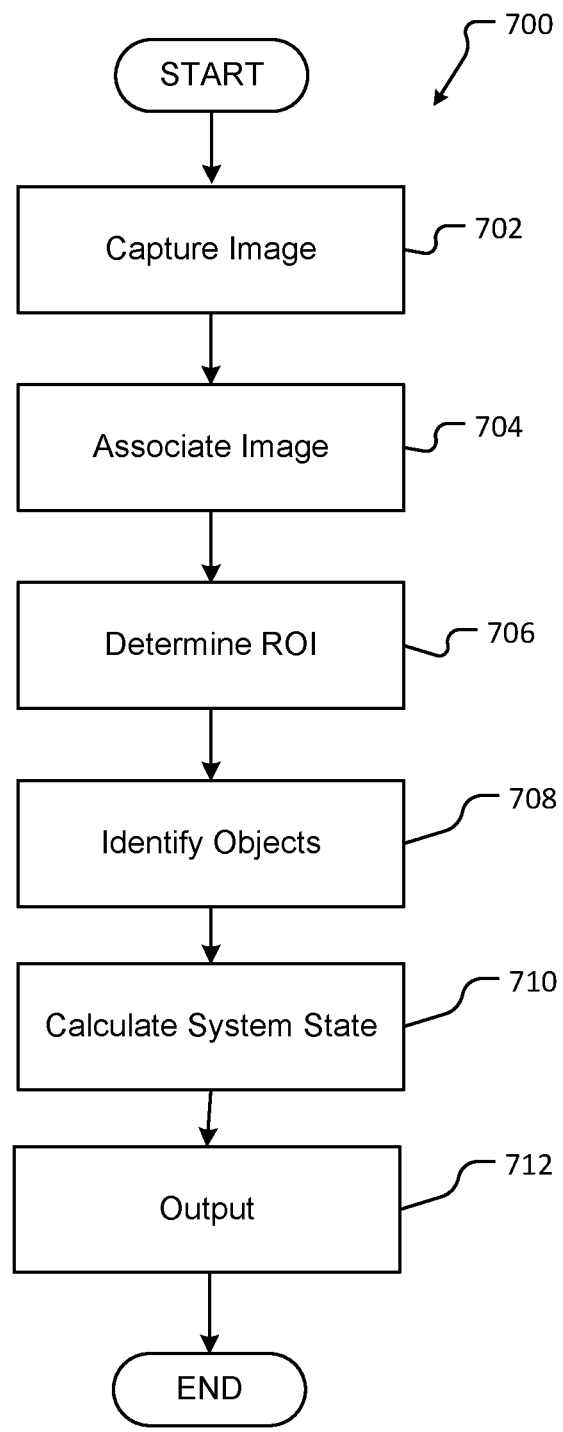
FIG. 7 is a method of performing object imaging and detection of objects in an MMSM by the object imaging and detection application according to an example of the instant disclosure.

FIG. 7 is a method 700 of performing object imaging and detection of objects in an MMSM by the object imaging and detection application according to an example of the instant disclosure. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

Method 700 begins with capture image operation 702. In operation 702, an image is captured using an image capture device, such as the imaging devices discussed herein and the imaging system 120 discussed with reference to FIG. 1. The image may also be an image formed by translating sensor information using a wavelet filter. Such signal information may include electrical current and accelerometers associated with an imaging system, such as imaging system 120.

Method 700 then proceeds to associate an image with operational parameters operation 704. In operation 704, the image may be associated with various operational parameters. For example, the time of the image capture, the positional information of the drill bit or other rig information at the time of image capture (such as for example drill rig information), the various environmental data (such as data captured by environmental sensors 180), and/or other System Data 100 may be associated with 25 the image. The association may be stored in a database, such as in a networked storage device 114.

Method 700 then proceeds to determine ROI operation 706. In operation 706, one or more ROIs are determined. The ROI may be a portion or the entirety of a field of vision of an image captured by a vision system, such as a vision system 120. One or more imaging devices may be located such that the regions of interest include an object flow, a portion or the entirety of an MMSM, or the like, and the ROI may include a first object flow and a second object flow. A first object flow may be selected as the ROI because the first object flow is wetter than a particular threshold and the second object flow is drier than the particular threshold. As an example, a portion of the at least one region of interest may be in freefall. As another example, a portion of the at least one region of interest may capture flying objects (e.g., objects bouncing above a shaker screen). As an example, a first region of interest may trigger and/or define a second region of interest dynamically based on information analyzed in the first region of interest. For example, the ROI may be determined based on the information associated with the image or other information. Additionally, an ROI may be selected to determine the state of an MMSM. Thus, the ROI may be of a screen of a shaker or other portion of a shaker.

A particular, non-limiting example of determining an ROI is as follows. A field of view may include a screen shaker having a ledge where objects in the object flow fall of the shaker enter free fall. The ledge may be automatically detected in the image data using the preprocessing techniques described herein and/or manually identified. Additionally/alternatively, a DNN may be used. For example, a region of interest may be selected by identifying the width of the shaker screen, a top edge, and a bottom edge. The distance from the top edge to the bottom edge may automatically be determined to ensure that at least one object in free fall is captured (e.g., the ROI is not so small as to not capture any single object).

In aspects of the technology, the images are captured using a video camera having a Frame rate per second (FPS). The distance of the bottom edge from the top edge may be determined such that each successive frame includes all new objects but no (or few) objects are missed. This may be accomplished by identifying the time/distance it takes for an object to fall through the ROI and setting the vertical length of the ROI such that the FPS matches the time it takes for an object to fall through the falling zone. In aspects, the traveled distance is determined by the kinematic equation $d=v_i*t+\frac{1}{2}*a*t^2$ where the initial vertical velocity of objects at the ledge is equal to 0 m/s and the acceleration is the gravity acceleration g=9.8 m/s2.

As a particular example, where the FPS of an imaging device is 30, the vertical length of the ROI may be selected such that an object entering the falling zone (i.e., starting to fall) takes $\frac{1}{30}^{th}$ of a second to pass through the ROI. This allows, for certain applications, easier calculation of the volume of objects in an object flow because duplicate counting may be avoided.

Method 700 optionally proceeds to preprocess image operation 707. In operation 707 image data is preprocessed. In aspects of the technology, image data associated with one or more ROIs is normalized prior to sending the image data to a DNN for object detection and classification. For example, an edge of a shaker may be identified using edge detection, blob detection, or a trained DNN (or other techniques). The image may then be rotated such that image data fed to a DNN has a more uniform orientation (e.g., with the edge of a shaker table parallel to horizontal access). Additionally, the image may be white balanced, brightness equalization, and or cropped to provide a classification DNN with a more uniform image data (e.g., one with a standard pixel size such as 256×256, 224×224, etc., one that does not have large variation in white balance, brightness equalization, etc.). Light correction may be performed. In aspects of the technology, light correction may be performed by segmenting an ROI into segments (e.g., segmenting by channels of an MMSM, which may be detected using a DNN, edge detection, or other technique). A histogram may be applied to each segment. Other parameters such as color, bit depth, aspect ratio, etc. may be adjusted to better represent values for which the DNN has been trained. This may be done to send relatively more normalized (e.g., rotated in a particular way, light corrected) image data to a DNN, such as the DNN described with reference to operation 508. One advantage to preprocessing is that a DNN need not be significantly retrained for each imaging device across multiple MMSM, rig sites, weather conditions, lighting conditions, etc.

Method 700 proceeds to identify objects operation 708. In operation 708, image analysis is applied to the one or more ROIs (as optionally preprocessed in operation 707) to detect and classify one or more objects in an image and/or one or more characteristics of a wavelet image. For example, in operation 708 at least one wellbore object is identified using the image information. Detection may occur using a DNN. Additionally, the operation 708 may further include detecting an absence of the at least one wellbore object using the image information. Additionally, the characteristics of the at least one detected wellbore object may be identified. This includes various physical properties, such as shape, volume, mass, material type, volume, a user-defined type, or another feature that may be trained using a DNN. Further, the DNN may be trained to identify MMSM wear, such as damage to a screen, build-up on a screen, uneven table leveling, overflow of a shaker, and the like. Further, the DNN may be trained to identify objects outside of the object flow, such as the presence of a pressure washer (indicating pressure washing), a screen change out, and/or screen removal. As noted herein, the classifying may be based on machine learning and by tuning the image captured by the vision system.

Method 700 proceeds to calculate system state operation 710. In operation 710, the detected and classified objects (and/or other information) identified in operation 708 are used to calculate one or more system states. For example, the number, rate of change, and acceleration of change of objects/signals are aggregated and compared to a normal and/or setpoint. The normal and or setpoint may automatically update based on the data associated with the image in operation 704. Additionally, the presence or absence of MMSM wear, increased frequency of events such as pressure washing, etc., may be aggregated. After comparison, one a wellbore state, including average cuttings volume, drill rig performance, the likelihood of well failure, productivity region of well, the safety level of region of well, drill bit state. MMSM state, screen state may be determined.

The method 700 then proceeds to output operation 712. In output operation 512, the number of objects, the type of objects, and or the system state may be output to various engines or applications, such wellbore stability and control application 402.

Figure 8A:
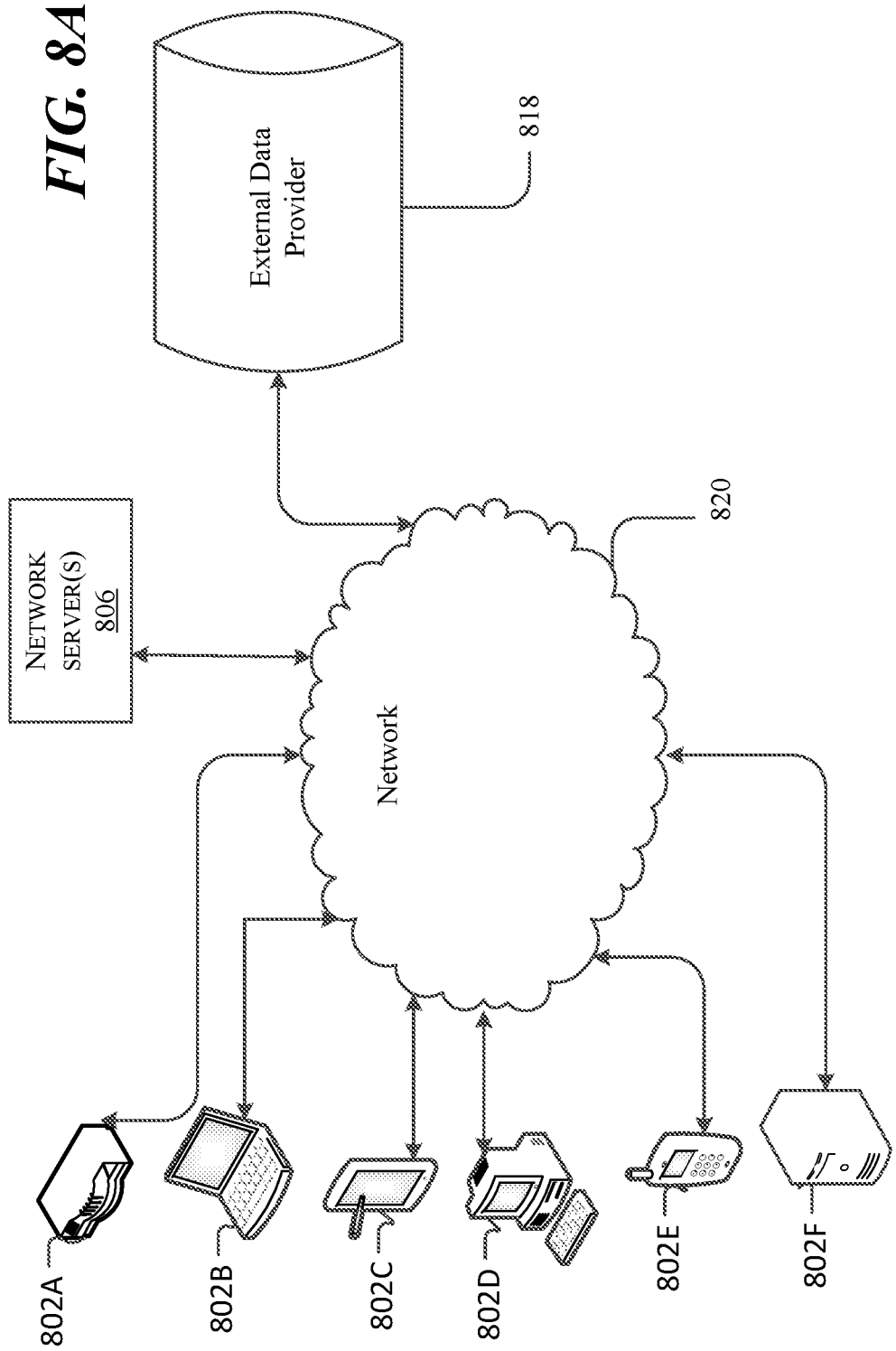
FIG. 8A is an example diagram of a distributed computing system 800 in which aspects of the present innovative technology, including the object imaging and detection engine described above, may be implemented.

FIG. 8A is an example diagram of a distributed computing system 800 in which aspects of the present innovative technology, including the object imaging and detection engine described above, may be implemented. According to examples, any computing devices, such as a modem 802A, a laptop computer 802B, a tablet 802C, a personal computer 802D, a smartphone 802E, and a server 802F, may contain engines, components, engines, etc. for controlling the various equipment associated with image capture and detection. Additionally, according to aspects discussed herein, any of the computing devices may contain the necessary hardware for implementing aspects of the disclosure. Any and/or all of these functions may be performed, by way of example, at network servers and/or server when computing devices request or receive data from external data providers by way of a network 820.

Figure 8B:
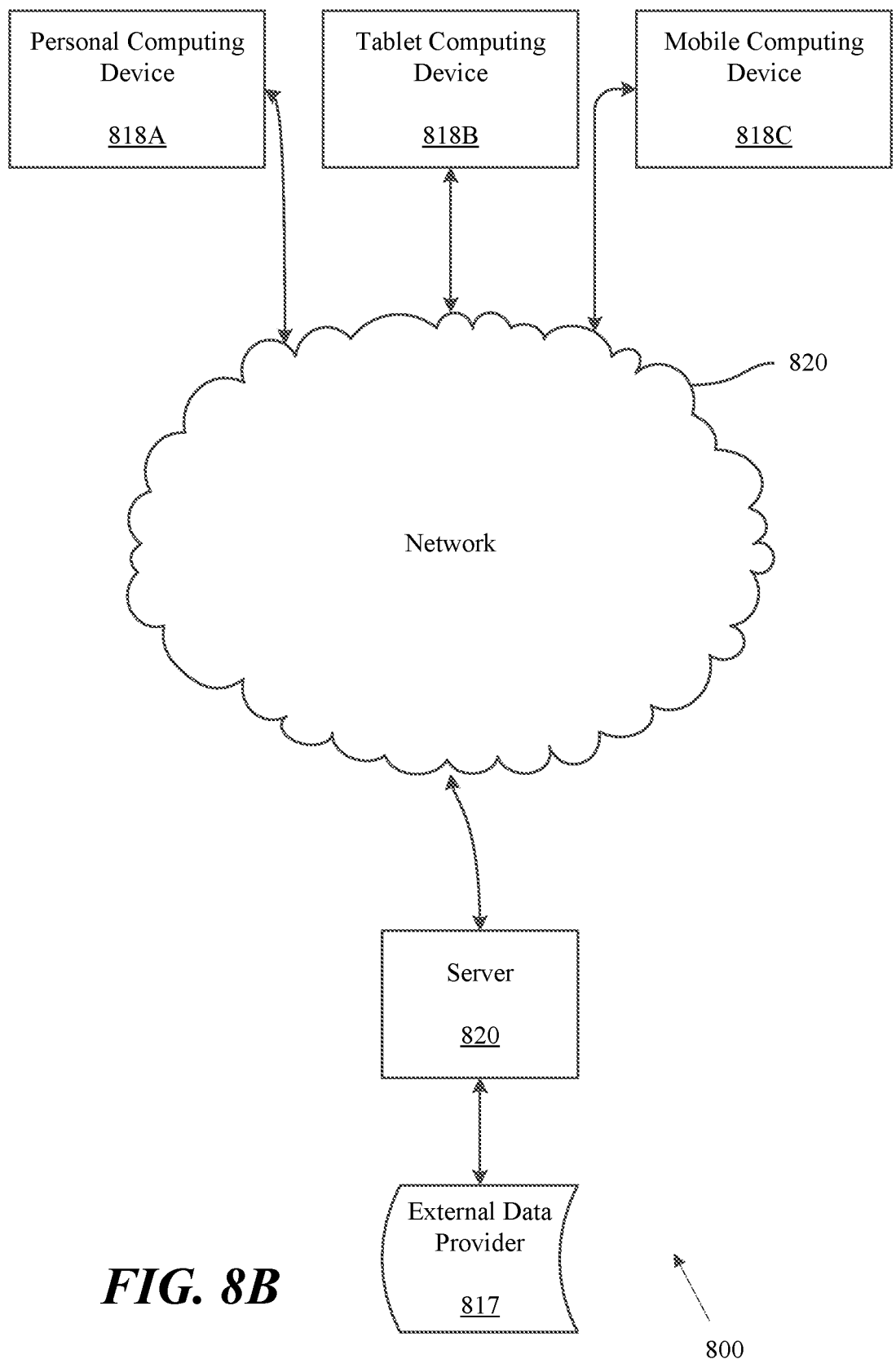
Turning to FIG. 8B, one embodiment of the architecture of a system for performing the technology discussed herein is presented.

Turning to FIG. 8B, one embodiment of the architecture of a system for performing the technology discussed herein is presented. Content and/or data interacted with, requested, and/or edited in association with one or computing devices may be stored in different communication channels or other storage types. For example, data may be stored using a directory service, a web portal, a mailbox service, an instant messaging store, or a compiled networking service for image detection and classification. The distributed computing system 800 may be used for running the various engines to perform image capture and detection, such as those discussed with reference to FIG. 4. The computing devices 818A, 818B, and/or 818C may provide a request to a cloud/network 85, which is then processed by a network server 806 in communication with an external data provider 817. By way of example, a client computing device may be implemented as any of the systems described herein and embodied in the personal computing device 818A, the tablet computing device 818B, and/or the mobile computing device 818C (e.g., a smartphone). Any of these aspects of the systems described herein may obtain content from the external data provider 817.

In various examples, the types of networks used for communication between the computing devices that make up the present invention include, but are not limited to, the Internet, an intranet, wide area networks (WAN), local area networks (LAN), virtual private networks (VPN), GPS devices, SONAR devices, cellular networks, and additional satellite-based data providers such as the Iridium satellite constellation which provides voice and data coverage to satellite phones, pagers, and integrated transceivers, etc. According to aspects of the present disclosure, the networks may include an enterprise network and a network through which a client computing device may access an enterprise network. According to additional aspects, a client network is a separate network accessing an enterprise network through externally available entry points, such as a gateway, a remote access protocol, or a public or private Internet address.

Additionally, the logical operations may be implemented as algorithms in software, firmware, analog/digital circuitry, and/or any combination thereof, without deviating from the scope of the present disclosure. The software, firmware, or similar sequence of computer instructions may be encoded and stored upon a computer-readable storage medium. The software, firmware, or similar sequence of computer instructions may also be encoded within a carrier-wave signal for transmission between computing devices.

Operating environment 900 typically includes at least some form of computer-readable media. Computer-readable media can be any available media that can be accessed by a processor such as processing device 980 depicted in FIG. 9 and processor 1002 shown in FIG. 10 or other devices comprising the operating environment 900. By way of example, and not limitation, computer-readable media may comprise computer storage media and communication media. Computer storage media includes volatile and non-volatile, and removable and non-removable media implemented in any method or technology for storage of information such as computer-readable instructions, data structures, program engines, or other data. Computer storage media includes RAM. ROM. EEPROM, flash memory or other memory technology. CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer-readable instructions, data structures, program engines, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic. RF, infrared, and other wireless media. Combinations of any of the above should also be included within the scope of computer-readable media.

The operating environment 900 may be a single computer operating in a networked environment using logical connections to one or more remote computers. The remote computer may be a personal computer, a GPS device, a monitoring device such as a static-monitoring device or a mobile monitoring device, a pod, a mobile deployment device, a server, a router, a network PC, a peer device, or other common network nodes, and typically includes many or all of the elements described above as well as others not so mentioned. The logical connections may include any method supported by available communications media. Such networking environments are commonplace in enterprise-wide computer networks, intranets, and the Internet.

Figure 10:
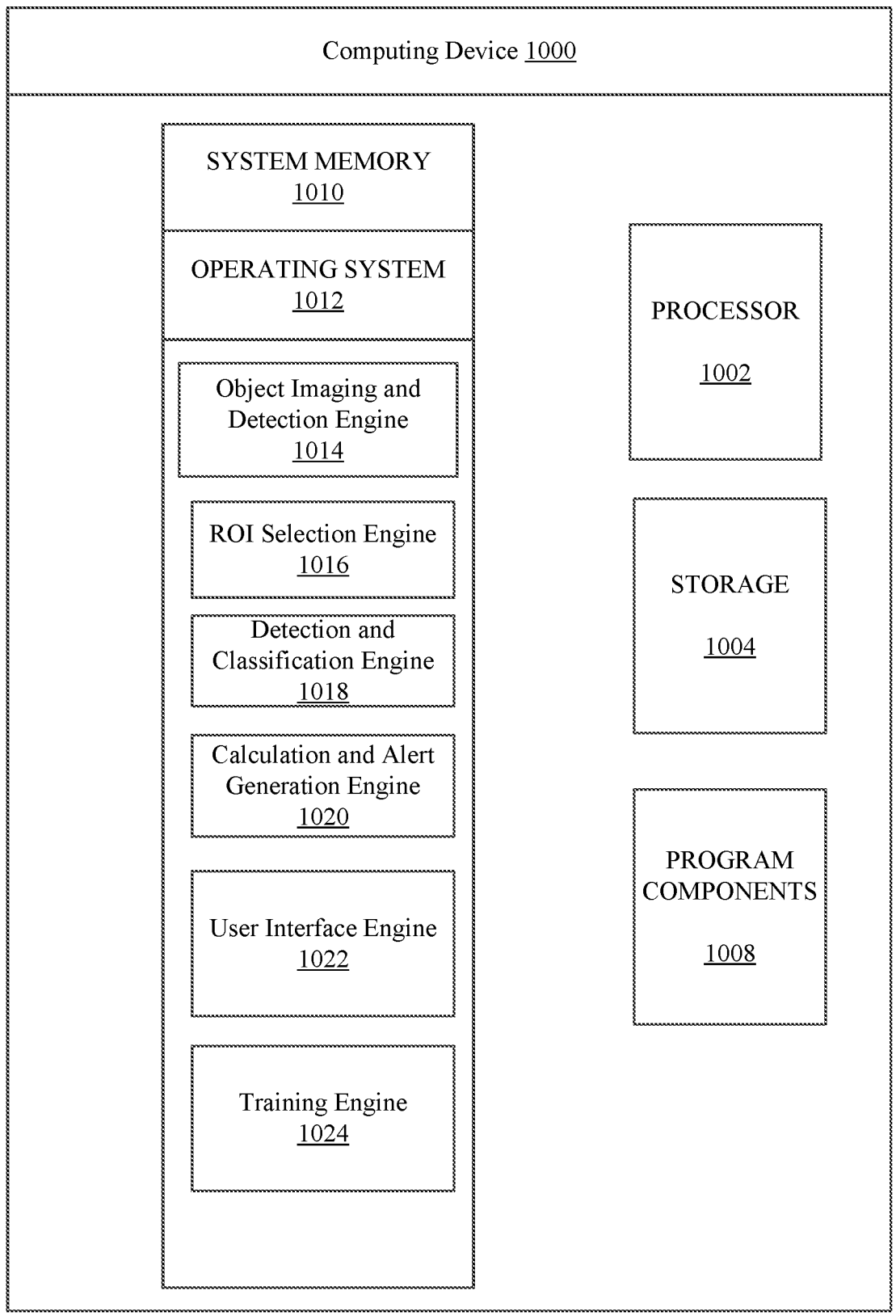
FIG. 10 is a block diagram illustrating additional physical components (e.g., hardware) of a computing device with which certain aspects of the disclosure may be practiced.

FIG. 10 illustrates one aspect of a computing system 1000 that may be used to implement aspects of the present disclosure, including any of the plurality of computing devices described herein with reference to the various figures and their corresponding descriptions. The computing device 1000 illustrated in FIG. 10 can be used to execute an operating system 996, application programs 998, and program engines 903 (including the engines described with reference to FIG. 4) described herein.

The computing device 910 includes, in some embodiments, at least one processing device 980, such as a central processing unit (CPU). A variety of processing devices are available from a variety of manufacturers, for example, Intel, Advanced Micro Devices, and/or ARM microprocessors. In this example, the computing device 910 also includes a system memory 982, and a system bus 984 that couples various system components including the system memory 982 to the at least one processing device 980. The system bus 984 is one of any number of types of bus structures including a memory bus, or memory controller: a peripheral bus; and a local bus using any of a variety of bus architectures.

Examples of devices suitable for the computing device 910 include a server computer, a pod, a mobile-monitoring device, a mobile deployment device, a static-monitoring device, a desktop computer, a laptop computer, a tablet computer, a mobile computing device (such as a smartphone, an iPod® or iPad® mobile digital device, or other mobile devices), or other devices configured to process digital instructions.

Although the exemplary environment described herein employs a hard disk drive or a solid state drive as a secondary storage device, other types of computer-readable storage media are used in other aspects according to the disclosure. Examples of these other types of computer-readable storage media include magnetic cassettes, flash memory cards, digital video disks, Bernoulli cartridges, compact disc read-only memories, digital versatile disk read-only memories, random access memories, or read-only memories. Additional aspects may include non-transitory media. Additionally, such computer-readable storage media can include local storage or cloud-based storage.

A number of program engines can be stored in the secondary storage device 992 or the memory 982, including an operating system 996, one or more application programs 998, other program engines 903 (such as the software engines described herein), and program data 902. The computing device 910 can utilize any suitable operating system, such as Linux, Microsoft Windows™, Google Chrome™, Apple OS, and any other operating system suitable for a computing device.

According to examples, a user provides inputs to the computing device 910 through one or more input devices 904. Examples of input devices 904 include a keyboard 906, a mouse 908, a microphone 909, and a touch sensor 912 (such as a touchpad or touch-sensitive display). Additional examples may include input devices other than those specified by the keyboard 906, the mouse 908, the microphone 909, and the touch sensor 912. The input devices are often connected to the processing device 980 through an input/output (I/O) interface 914 that is coupled to the system bus 984. These input devices 904 can be connected by any number of I/O interfaces 914, such as a parallel port, serial port, game port, or universal serial bus. Wireless communication between input devices 904 and the interface 914 is possible as well and includes infrared, BLUETOOTH® wireless technology, cellular, and other radio frequency communication systems in some possible aspects.

In an exemplary aspect, a display device 916, such as a monitor, liquid crystal display device, projector, or touch-sensitive display device, is also connected to the computing system 910 via an interface, such as a video adapter 918. In addition to the display device 916, the computing device 910 can include various other peripheral devices, such as speakers or a printer.

When used in a local area networking environment or a wide area networking environment (such as the Internet), the computing device 910 is typically connected to a network such as network 820 shown in FIGS. 8A and 8B through a network interface, such as an Ethernet interface. Other possible embodiments use other communication devices. For example, certain aspects of the computing device 910 may include a modem for communicating across the network. The computing device 910 typically includes at least some form of computer-readable media. Computer-readable media includes any available media that can be accessed by the computing device 910. By way of example, computer-readable media include computer-readable storage media and computer-readable communication media.

Figure 9:
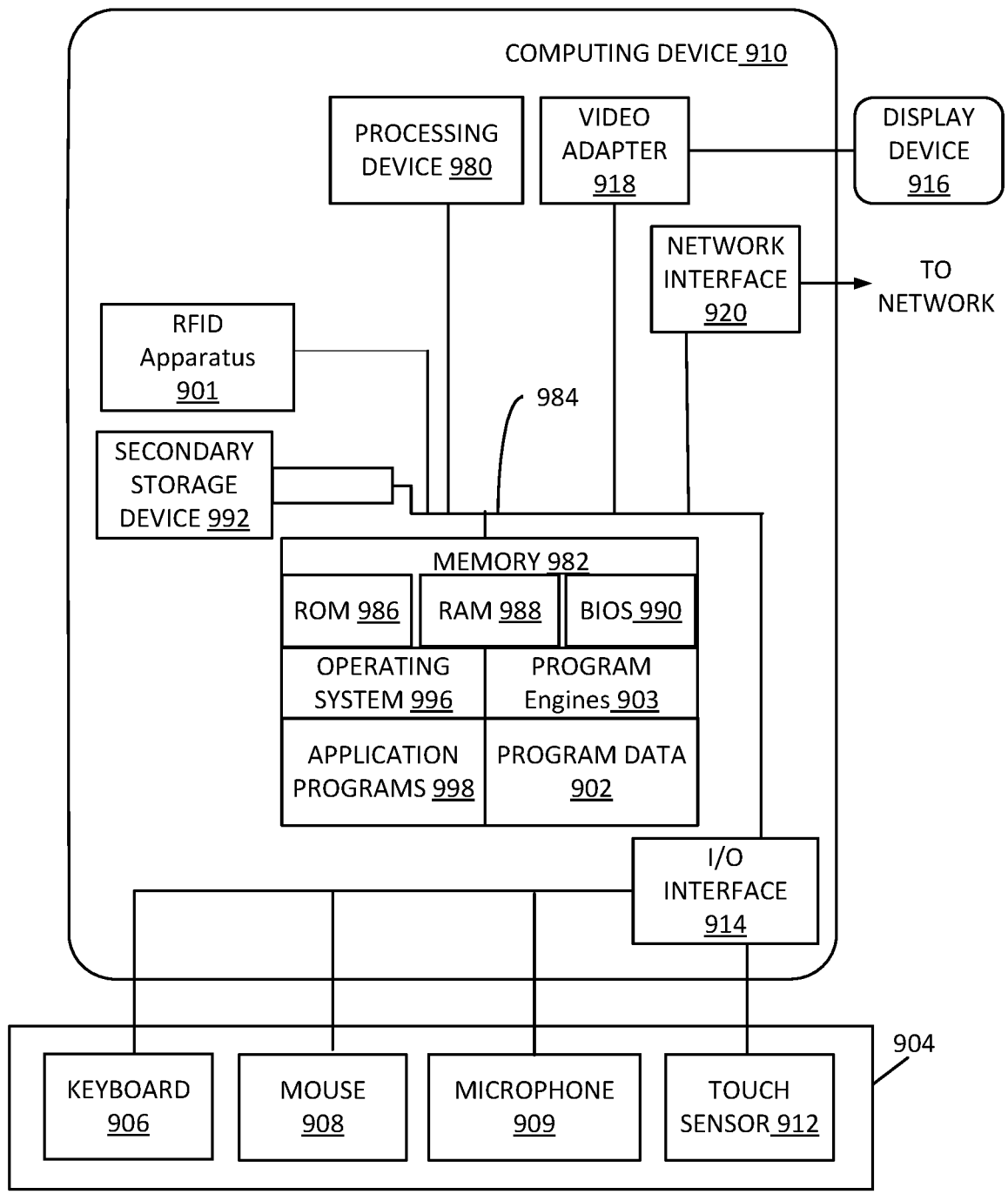
FIG. 9 illustrates an example computing environment on which aspects of the present disclosure may be implemented.

The computing device 910 illustrated in FIG. 9 is also an example of programmable electronics, which may include one or more such computing devices, and when multiple computing devices are included, such computing devices can be coupled together with a suitable data communication network so as to collectively perform the various functions, methods, or operations disclosed herein.

FIG. 10 is a block diagram illustrating additional physical components (e.g., hardware) of a computing device 1000 with which certain aspects of the disclosure may be practiced. Computing device 1000 may perform these functions alone or in combination with a distributed computing network such as those described with regard to FIGS. 8A and 8B which may be in operative contact with personal computing device 818A, tablet computing device 818B and/or mobile computing device 818C which may communicate and process one or more of the program engines described herein.

In a basic configuration, the computing device 1000 may include at least one processor 1002 and a system memory 1010. Depending on the configuration and type of computing device, the system memory 1010 may comprise, but is not limited to, volatile storage (e.g., random access memory), non-volatile storage (e.g., read-only memory), flash memory, or any combination of such memories. The system memory 1010 may include an operating system 1012 and one or more program engines 1014. The operating system 1012, for example, may be suitable for controlling the operation of the computing device 1000. Furthermore, aspects of the disclosure may be practiced in conjunction with a graphics library, other operating systems, or any other application program and are not limited to any particular application or system.

The computing device 1000 may have additional features or functionality. For example, the computing device 1000 may also include an additional data storage device (removable and/or non-removable) such as, for example, magnetic disks, optical disks, or tape. Such additional storage is illustrated in FIG. 10 by storage 1004. It will be well understood by those of skill in the art that storage may also occur via the distributed computing networks described in FIG. 8A and FIG. 8B. For example, computing device 1000 may communicate via network 820 in FIG. 8A and data may be stored within network servers 806 and transmitted back to computing device 1000 via network 820 if it is determined that such stored data is necessary to execute one or more functions described herein. Additionally, computing device 1000 may communicate via network 820 in FIG. 8B and data may be stored within network server 806 and transmitted back to computing device 1000 via a network, such as network 820, if it is determined that such stored data is necessary to execute one or more functions described herein.

As stated above, a number of program engines and data files may be stored in the system memory 1010. While executing the at least one processor 1002, the program engines 1014 (e.g., the engines described with reference to FIG. 4) may perform processes including, but not limited to, the aspects described herein.

Figures 11A, 11B:
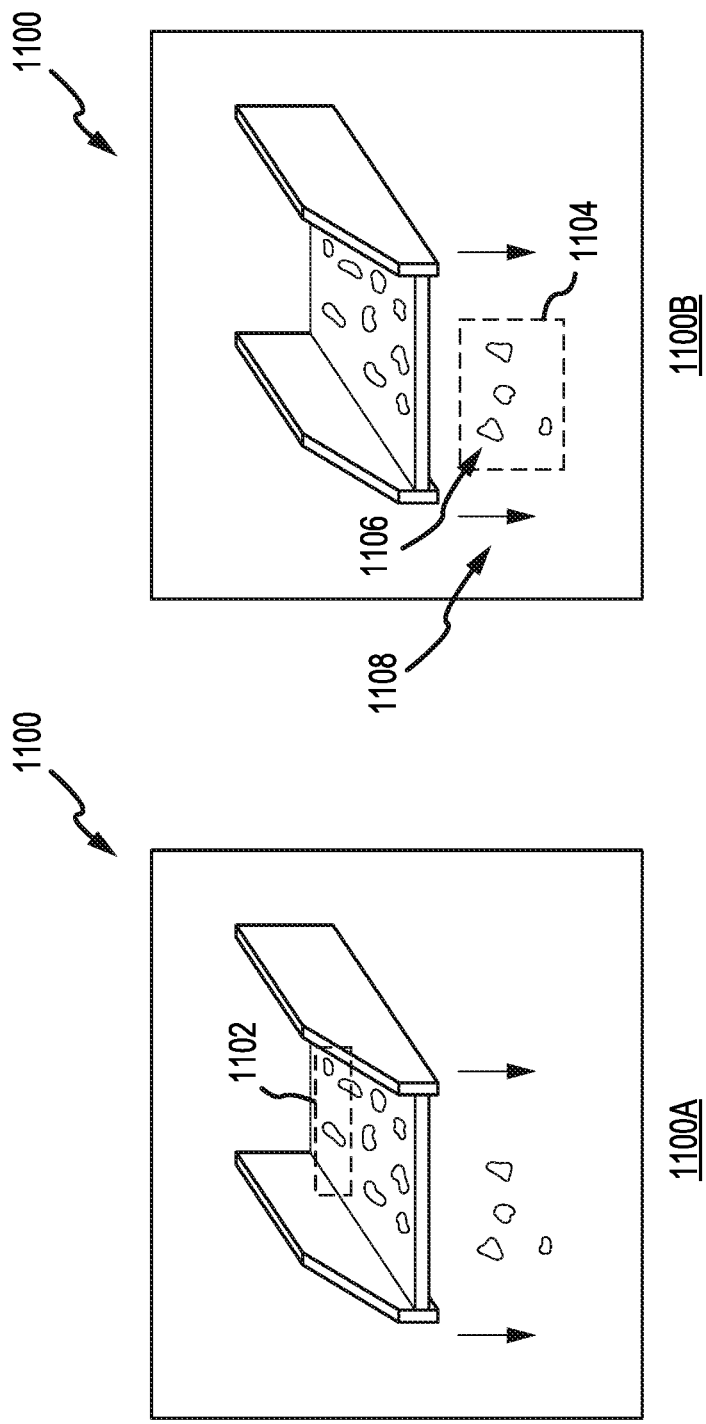
FIGS. 11A and 11B illustrate examples of regions of interest.

FIGS. 11A and 11B illustrate an example change in an ROI of a field of view 1100 between a first time (T1) and a second time (T2). In examples, the field of view 1100 is captured by a single camera. Field of view 1100 may be the entire field of view of an imaging device, which may be the same as or similar to the imaging devices described with reference to FIG. 1. FIG. 11A illustrates a first region of interest 1102 in a field of view 1100 at time T1 and a second region of interest 1104 in the field of view 1100 at time T2.

In aspects of the technology, an object imaging and detection application, such as the object imaging and detection application 108 described herein, dynamically determines a new region of interest within one or more fields of view from a first-time T1 and a second, later time T2. In other examples, T2 occurs before T1. For example, where an object of interest is detected downstream, an object imaging and detection application may access historical image data that includes an upstream, earlier in time ROI. Such access may occur by the object imaging and detection application accessing a networked database.

In aspects of the technology, the ROI 1102/1104 size and or shape is determined by one or more computing devices based on the direction and velocity of an object in an object flow. For example, ROI 1104, which illustrates an ROI 1104 including objects 1106 falling in a falling zone 1108 of an MMSM, may be sized and shaped such that the image captures the entirety of at least one object through fall. In some aspects where the object is traveling at a high velocity and/or acceleration, the ROI may be vertically taller to capture the entire object in an object flow than would be needed if the object were stationary. This may occur, for example, where the imaging device was at a resolution/shutter speed that caused an object to appear longer (because of imaging distortion, e.g., streaking of the image) than would have appeared had the object been stationary.

It will further be appreciated that the field of view may be captured in real-time relative to the setting/analysis of the first ROI 1102 and the second ROI 1104. It will also be appreciated that the image capture may occur in the past relative to when an object imaging and detection application is setting/analyzing a region of interest. In aspects of the technology, an object imaging and detection application identifies an anomaly, such as an object of interest, and the object imaging and detection application may set a new ROI at T2. The object imaging and detection application may set the new ROI by identifying a region that may be easier to identify objects in an object flow. For example, the new ROI may be in an area of an object flow that is drier and/or slower. It will also be appreciated that the selection of a new ROI may change from one ROI to many ROIs, and from many ROIs to fewer ROIs as determined by an object imaging and detection application as further described herein.

Additionally, the settings of an imaging device may be changed to assist image capture and/or change the ROI. For example, the shutter speed, exposure, resolution, and gain may be adjusted to account for velocity, illumination level, or other conditions. Where velocity and/or illumination are higher, shutter speed may be increased to allow for a relatively smaller field of view to be used. For certain applications, a smaller ROI is desirous because, among other factors, smaller ROIs tend to need less processing time and processing power and require less network bandwidth to transmit than larger ROIs, assuming all other parameters are equal.

Figure 12:
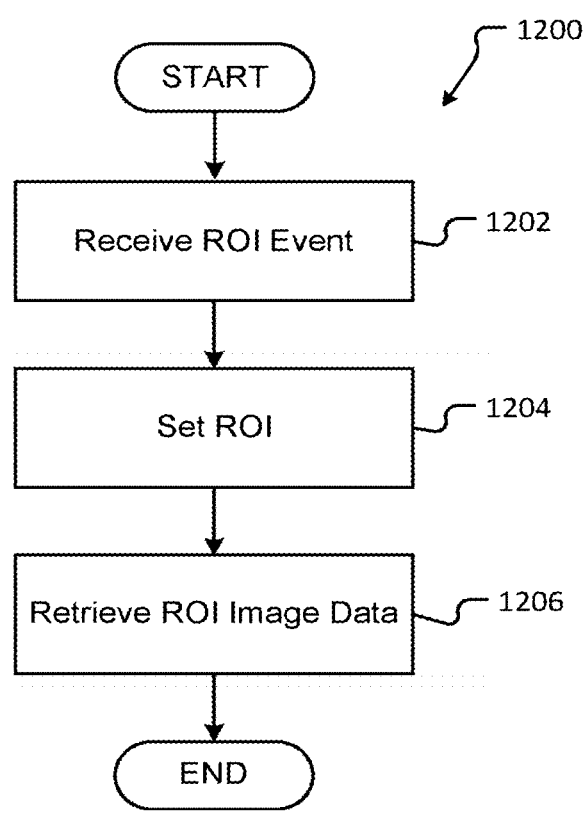
FIG. 12 illustrates a method for setting an ROI.

FIG. 12 illustrates a method for setting an ROI. Although the example method 1200 depicts a particular sequence of operations, the sequence may be altered without departing from the scope of the present disclosure. For example, some of the operations depicted may be performed in parallel or in a different sequence that does not materially affect the function of the method 1200. In other examples, different components of an example device or system that implements the method 1200 may perform functions at substantially the same time or in a specific sequence. Method 1200 begins with receiving ROI event operation 1202. In operation 1202 an ROI event is received. An ROI event is data that is received by an object imagining and detection application, such as the object imaging and detection application described above, that causes the program to set, change, remove, and/or add additional ROIs for analysis. Table III below provides example ROI events and corresponding potential actions regarding ROIs:

TABLE III

| Event | Action |
| --- | --- |
| System Initialization | ROIs set at predetermined areas such as the falling zone of MMSM |
| Potential Object of Interest Detected | Additional ROIs set downstream to analyze more/higher resolution image devices. Increase ROI. |
| Potential failure detected | |
| No deviations from norm | Change ROI number, lower resolution, and/or decrease the size of ROI. |
| Changing drilling parameters | Adjust size, shape, and number of ROIs accordingly |
| Human Activity | ROI set to increase to image maintenance activities |
| Illumination level | Shift ROI region |
| Audio, current, or other sensor input | Expand region of interest |
| Imaging conditions suboptimal | Adjust illumination, filters, wipers, wavelengths, etc. to improve image quality |

Method 1200 then proceeds to retrieve ROI image data operation 1206. The ROI may be applied to real-time or near real-time image data. Additionally, the ROI may be applied to historical data. In operation 1206, the image data of the ROI is retrieved and sent to a detection and classification engine such as detection and classification engine described above for image detection and classification.

Figure 13:
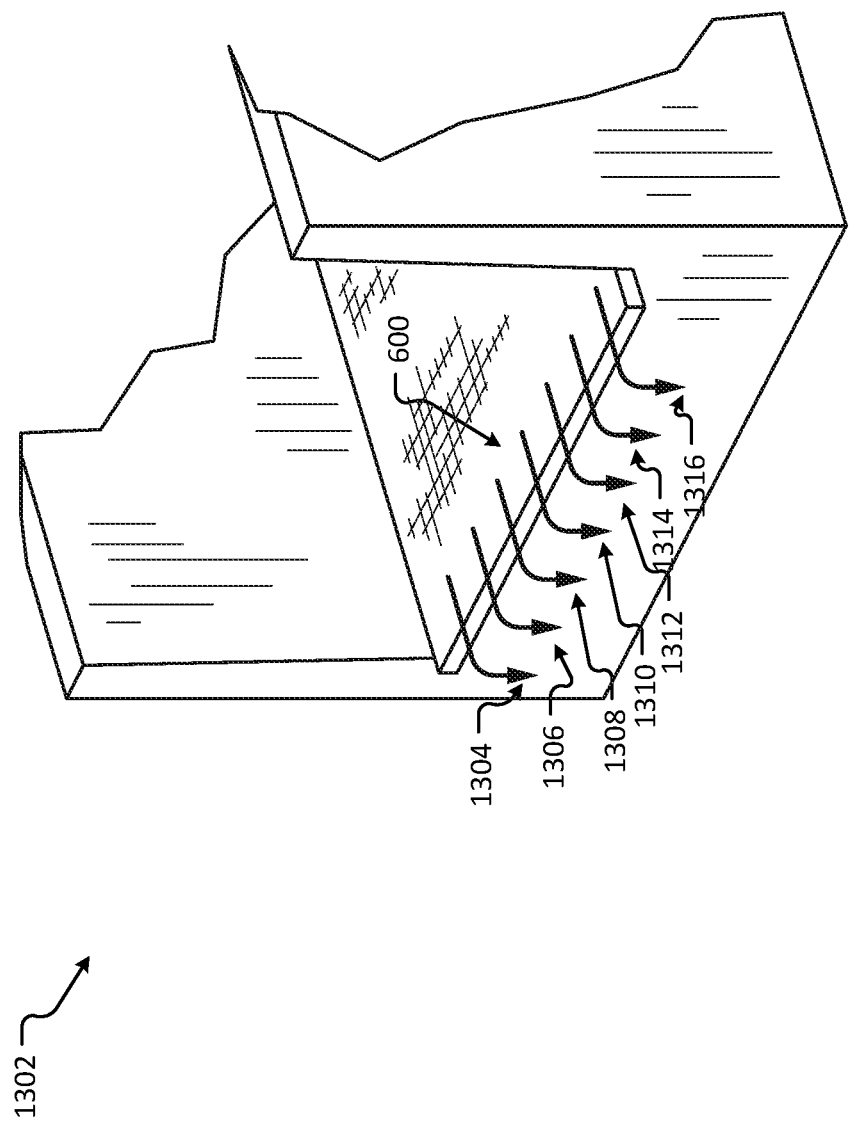
FIG. 13 is an example illustration of channels of an MMSM.

FIG. 13 is an example illustration of channels of an MMSM 1302 having a screen 1318. Illustrated is a first channel 1304, a second channel 1306, a third channel 1308, a fourth channel 1310, a fifth channel 1312, a sixth channel 1314, and a seventh channel 1316. Channels are paths of travel of one or more objects in an object flow. These paths of travel may be influenced by the MMSM screen type, screen condition, and operation state (e.g., dirty, clean, broken, etc.). The number of channels may be preset by a user of the systems described herein. Alternatively, a DNN may automatically identify channels using training data. Objects in object flow may be aggregated by channel and displayed using the GUIs described herein.

Figure 14:
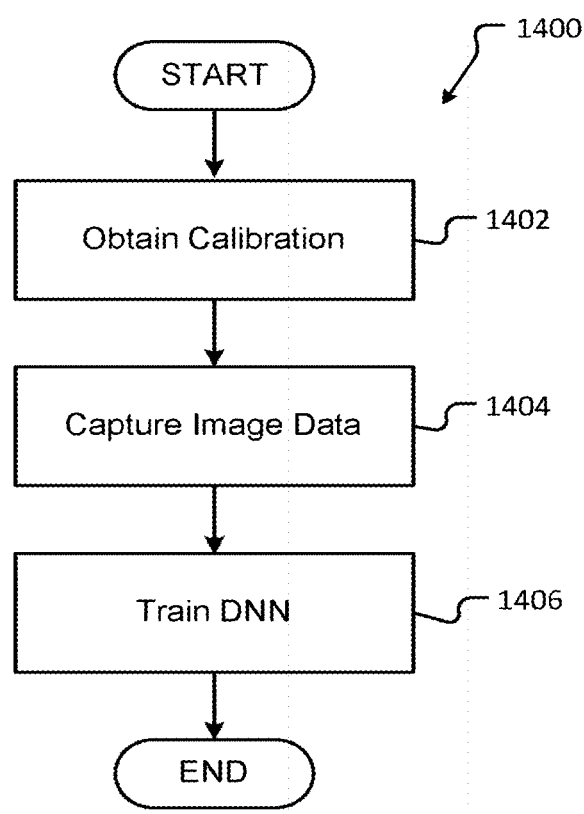
FIG. 14 illustrates a method of measuring the volume and/or mass of a shaker load coming across the shaker using a vision system

FIG. 14 illustrates a method of measuring the volume and/or mass of a shaker load coming across the shaker using a vision system. FIG. 14 is discussed with respect to well environment 1500 having an MMSM 1502 and a vision system 1506 in electronic communication with an object imaging and detection engine (not shown). It will be appreciated that vision system 1506 may have the same or similar properties as the vision systems discussed above and the object imaging detection engine has the same or similar properties as discussed above.

Method 1400 begins with obtaining calibration operation 1402. To obtain calibration operation 1402 a known volume/mass of cuttings and or object flow is obtained. Known volume/mass may be obtained in a variety of ways. A cuttings volume meter (CVM) may be used to identify the volume/mass of cuttings, fluids, and other objects coming off of the shaker table. Additionally/alternatively, the object flow of a shaker table may be collected into a container of known volume. The container may be weighed, and the constituent parts of the flow may be separated to determine the volume and mass of cuttings, cavings, liquids, and other objects in an object flow 1508. Operation 1402 may be repeated numerous times for object flow with various liquid to solid content, liquid densities, number of objects, etc. The result of operation 1202 is a mass/volume of cuttings, cavings, drilling fluid, and or other objects in the object flow.

Figure 15:
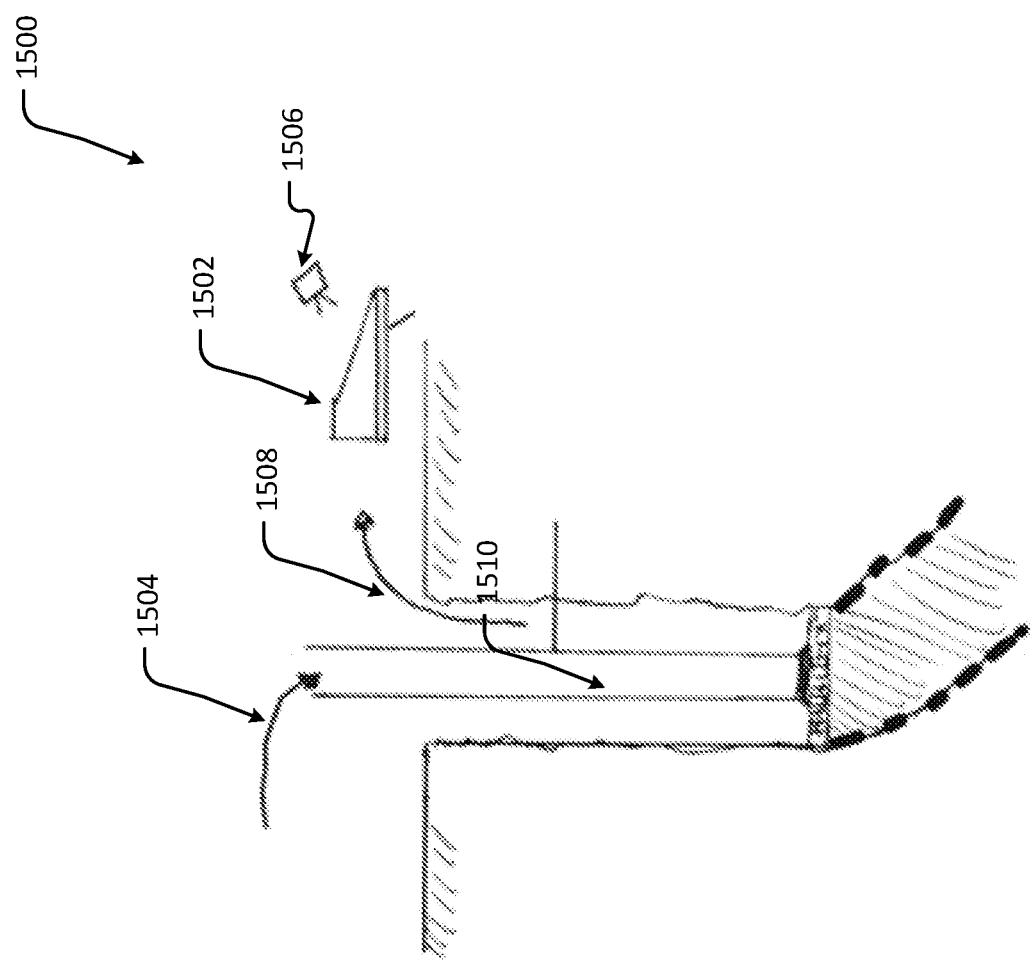
FIG. 15 is an example well environment in which aspects of the technology may be used.

Calibration may also occur by drilling a well of known volume and tracking that volume through the system. For example, a well hole 1510 as shown in FIG. 15 may be formed by removing a certain volume and mass of rock. Drilling fluid 1504 displaces the drilling cuttings and other debris, causing the objects to flow up the wellhole in an object flow 1408 to be processed by one or more MMSMs 1502. In this way, the volume/mass of cuttings and rock removed may be known and/or estimated. In aspects of the technology, the fluid 1504 includes a tracer, or metal and rubber float equipment that is easily identifiable by vision system 1506.

Method 1400 also includes capture image data 1206 operation. In operation 1404, an image/video of the MMSM 1502 is captured during operation 1402 using vision system 1506. In the case of calibration by drilling a well of known volume, the captured image may be associated with the object flow 1508 by identifying the tracer liquid such that all flow of objects from the wellbore is captured.

Method 1400 proceeds to train DNN 1406. A DNN may be trained using the calibration data captured in operation 1402 and associated with the image data captured at operation 1404. This results in a trained DNN such that images of object flows at various ROIs may be analyzed by a DNN and a cuttings volume, cuttings mass, liquid volume, liquid mass, and/or other objects may be estimated using the image data.

Once calibrated, image data may be used to identify potential issues with drilling. For example, drilling while drilling the hole can become enlarged to a size larger than the drilling bit diameter due to vibration, wellbore instability, and excessive flow rates. These enlarged zones can be referred to as washouts and cause significant problems with hole cleaning. Conversely, the hole can become reduced if the formation swells creating restrictions for the BHA. Once calibrated, image data may be used to identify object flow that indicates a greater or smaller than usual for the expected drill hole size.

Figure 16:
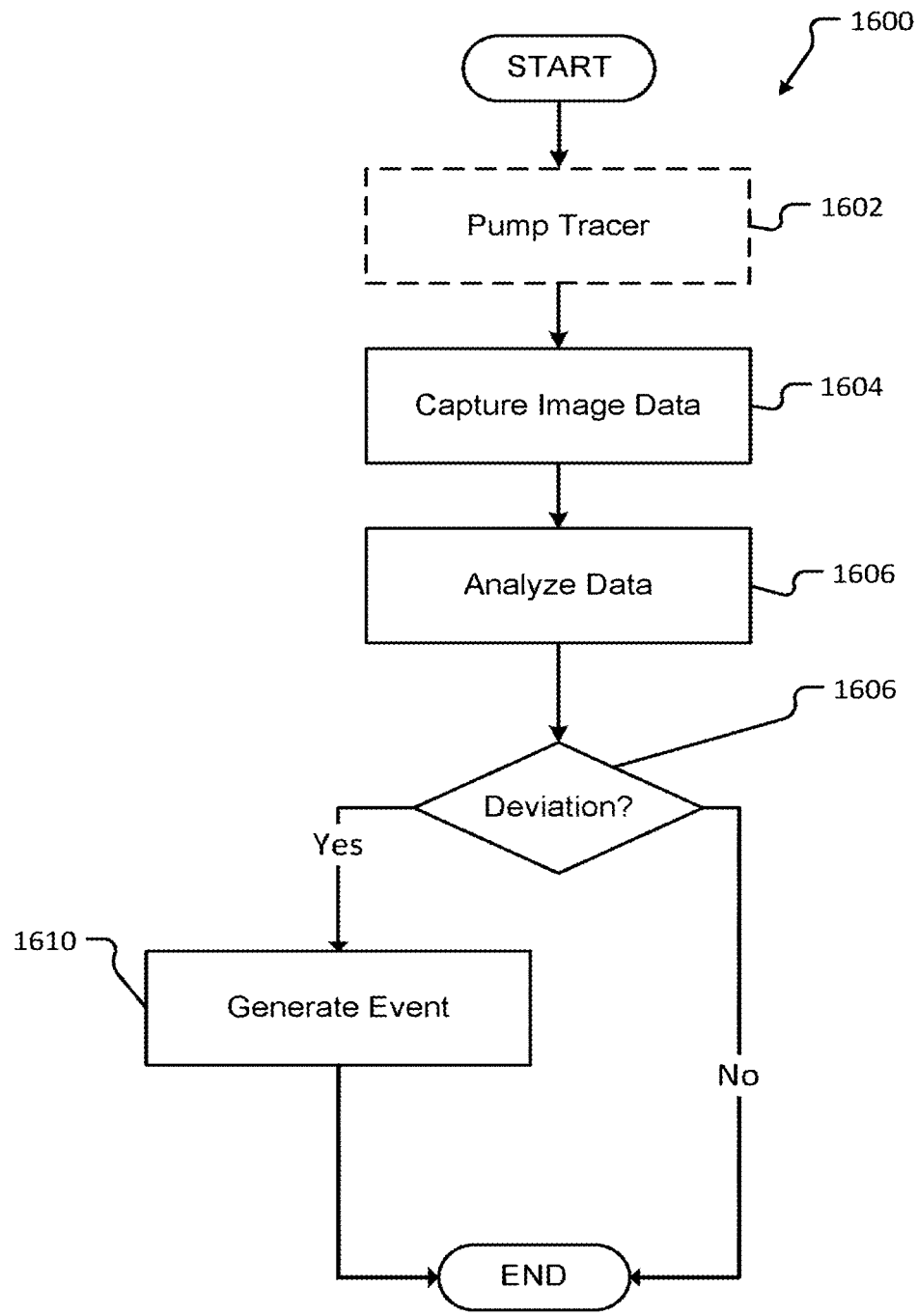
FIG. 16 is a method to update a cuttings-transport model.

FIG. 16 is a method 1600 to update the cuttings transport model. Method 1600 optionally begins with a pump tracer into well operation 1602. In some aspects of the technology, the tracer may be easily identified by a vision system and an object imaging and detection engine because of variant contrast.

Method 1600 then proceeds to capture traced object flow operation 1604. In operation 1604, the object flow with tracer is captured using a vision system, such as the vision system described herein.

Method 1600 then proceeds to analyze image data operation 1606. In operation 1606, the image data, which may include cutting size, shape, and sphericity, are analyzed to determine the volume of cuttings, liquid, cavings, etc.

Method 1600 then proceeds to send update operation 1608, where an update is sent to a cuttings transport model. In aspects of the technology, the measured volume/mass of the object flow is sent to the cuttings transport model.

The description and illustration of one or more embodiments, examples, or aspects of the technology provided in this application are not intended to limit or restrict the scope of the invention as claimed in any way. The embodiments, examples, and details provided in this application are considered sufficient to convey possession and enable others to make and use the best mode of claimed innovative technologies. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed:

1. A computer-implemented method of adjusting wellbore parameters, the computer-implemented method comprising:
   receiving, from an image device, image data of a region of interest ("ROI") from a mechanical mud separation machine (MMSM), the image data including image data of an object flow, wherein the ROI is determined by:
   identifying a ledge of an MMSM within the image data, the ledge being a location where objects in an object flow begin to free fall;
   setting a top edge of the ROI at the ledge; and
      identifying a frames per second of an imaging device capturing the image data; and
      calculating a vertical length of the first ROI based on the frames per second of the imaging device and the ledge;
   identifying, using the image data of the ROI, at least one wellbore-state indicator;
   determining, based on in part the identifying at least one wellbore-state indicator, to send information to control at least one wellbore parameter; and
   sending the information, wherein sending the information causes a change to at least one wellbore parameter.

2. The computer-implemented method of claim 1, wherein the at least one wellbore-state indicator includes a plurality of cavings.

3. The computer-implemented of claim 1, wherein the at least one wellbore parameter includes at least one selected from the group consisting of: mud weight, wellbore-fluid hydrostatic pressure, and wellbore-fluid flowrate.

4. The computer-implemented method of claim 1, wherein the at least one wellbore parameter is a hydrostatic pressure of the wellbore and wherein the method further comprises:
   receiving, by a control application of a wellbore, the information; and
   based on the received information, adjusting the hydrostatic pressure of a wellbore.

5. The computer-implemented method of claim 1, wherein identifying at least one wellbore-state indicator comprises analyzing the image data using a Deep Neural Network.

6. The computer-implemented method of claim 1, wherein the determining is also based on in part at least one operational information of the wellbore.

7. The computer-implemented method of claim 6, wherein the operational information of the wellbore is a standpipe pressure, a vertical depth of a drill head, a well inclination, or a predicted rock strength.

8. A non-transitory computer storage device storing instructions that, when executed, perform the method, the method comprising:
   receiving image data of a region of interest "ROI" from a mechanical mud separation machine (MMSM), the image data including image data of an object flow, wherein the ROI is determined by:
   identifying a ledge of an MMSM within the image data, the ledge being a location where objects in an object flow begin to free fall;
   setting a top edge of the ROI at the ledge; and
      identifying a frames per second on an imaging device capturing the image data; and calculating a vertical length of the first ROI based on the frames per second of the imaging device and the ledge;
   identifying, using the image data of the first region of interest, at least one wellbore-state indicator;
   determining, based on in part the identifying at least one wellbore-state indicator, to send information to control at least one wellbore parameter; and
   sending the information, wherein sending the information causes a change to at least one wellbore parameter.

9. The computer storage device of claim 8, wherein the at least one wellbore-state indicator includes a plurality of cavings.

10. The computer storage device of claim 8, wherein the at least one wellbore parameter includes at least one selected from the group consisting of: mud weight, wellbore-fluid hydrostatic pressure, and wellbore-fluid flowrate.

11. The computer storage device of claim 8, the method further comprising:
   receiving, by a control application of a wellbore, the information; and
   based on the received information, adjusting the hydrostatic pressure of a wellbore.

* * * * *